US 12,483,792 B2

(12) United States Patent
Chen et al.

(10) Patent No.: US 12,483,792 B2
(45) Date of Patent: Nov. 25, 2025

(54) VIDEO PROCESSING METHOD AND ELECTRONIC DEVICE

(71) Applicant: Huawei Technologies Co., Ltd., Shenzhen (CN)

(72) Inventors: Yanhua Chen, Beijing (CN); Hongma Liu, Beijing (CN); Chao Zhang, Beijing (CN); Yaqi Zhang, Beijing (CN); Hongyu Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 637 days.

(21) Appl. No.: 17/843,242

(22) Filed: Jun. 17, 2022

(65) Prior Publication Data

US 2022/0321788 A1    Oct. 6, 2022

Related U.S. Application Data

(63) Continuation of application No. PCT/CN2020/137550, filed on Dec. 18, 2020.

(30) Foreign Application Priority Data

Dec. 19, 2019   (CN) .......................... 201911315344.0
Jul. 30, 2020   (CN) .......................... 202010753515.4

(51) Int. Cl.
*H04N 23/695*   (2023.01)
*H04N 23/61*    (2023.01)
*H04N 23/63*    (2023.01)

(52) U.S. Cl.
CPC .......... *H04N 23/695* (2023.01); *H04N 23/61* (2023.01); *H04N 23/635* (2023.01)

(58) Field of Classification Search
None
See application file for complete search history.

(56) References Cited

U.S. PATENT DOCUMENTS

| | | | |
|---|---|---|---|
| 11,194,995 B1 * | 12/2021 | Profida Ferreira | G06V 40/169 |
| 2007/0120979 A1 | 5/2007 | Zhang et al. | |
| 2011/0091108 A1 | 4/2011 | Oshima | |
| 2018/0108144 A1 * | 4/2018 | Tsunashima | H04N 23/661 |
| 2019/0191094 A1 | 6/2019 | Khoe et al. | |

FOREIGN PATENT DOCUMENTS

| | | |
|---|---|---|
| CN | 103576848 A | 2/2014 |
| CN | 103607533 A | 2/2014 |
| CN | 104378552 A | 2/2015 |
| CN | 105979383 A | 9/2016 |
| CN | 106034216 A | 10/2016 |
| CN | 108334099 A | 7/2018 |
| CN | 108366303 A | 8/2018 |
| CN | 109905593 A | 6/2019 |
| CN | 110189378 A | 8/2019 |
| CN | 110198428 A | 9/2019 |

(Continued)

Primary Examiner — James M Anderson, II
(74) Attorney, Agent, or Firm — Conley Rose, P.C.

(57) ABSTRACT

A video processing method is provided. The method includes obtaining a first video frame, determining that the first video frame includes at least one target object, determining a cropping box by using the at least one target object as a center, obtaining content in the cropping box, and displaying the content as a second video frame.

20 Claims, 22 Drawing Sheets

(56) References Cited

FOREIGN PATENT DOCUMENTS

| | | | |
|---|---|---|---|
| CN | 110301136 | A | 10/2019 |
| CN | 110347877 | A | 10/2019 |
| CN | 110381281 | A | 10/2019 |
| CN | 110401766 | A | 11/2019 |
| CN | 110427833 | A | 11/2019 |
| CN | 110533700 | A | 12/2019 |
| JP | 2010068470 | A | 3/2010 |
| WO | 2012034329 | A1 | 3/2012 |
| WO | 2014023153 | A1 | 2/2014 |

* cited by examiner

VIDEO PROCESSING METHOD AND ELECTRONIC DEVICE

CROSS-REFERENCE TO RELATED APPLICATIONS

This is a continuation of International Patent Application No. PCT/CN2020/137550, filed on Dec. 18, 2020, which claims priority to Chinese Patent Application No. 202010753515.4, filed on Jul. 30, 2020 and Chinese Patent Application No. 201911315344.0, filed on Dec. 19, 2019. All of the aforementioned patent applications are hereby incorporated by reference in their entireties.

TECHNICAL FIELD

This disclosure relates to the field of computer vision, and in particular, to a video processing method for an electronic device and an electronic device.

BACKGROUND

With the popularization of an electronic device, especially the popularization of an intelligent mobile electronic device such as a mobile phone, increasingly more applications are integrated into the mobile phone, and relate to all aspects of people's daily life. The electronic device usually includes a camera, and can perform image collection and video shooting by using the camera.

In the conventional technology, when a video is collected, if a follow shot needs to be performed on a target object, the camera needs to be provided with a pan-tilt-zoom, and a shooting angle of the camera is rotated by using the pan-tilt-zoom, to implement the follow shot. However, there is a technical problem that costs are relatively high in this solution.

SUMMARY

This disclosure provides a video collection method and an electronic device, to resolve a technical problem in the conventional technology that costs are relatively high when a follow shot is implemented by using an electronic device.

An embodiment of this disclosure provides a video processing method. The method is applied to an electronic device, and includes: obtaining a first video frame, determining that the first video frame includes at least one target object, determining a cropping box by using the determined target object as a center, and using content in the cropping box as a second video frame. The electronic device may display the second video frame, and does not display the first video frame; or after displaying the first video frame, displays the second video frame in response to enabling a preset function by a user. In this way, a target object can be focused by using the video processing method without hardware improvement. In a scenario in which the target object moves, the target object can be automatically tracked, and the target object is always located in a visual center in a video frame. Therefore, an automatic tracking function can be implemented at low costs, and a hardware requirement can be reduced, thereby reducing implementation difficulty of the function.

An embodiment of this disclosure further provides an electronic device, and the electronic device performs the method in each method embodiment of the present disclosure. The electronic device includes one or more processors, one or more memories, a plurality of application programs, and one or more computer programs. The one or more computer programs are stored in the one or more memories. The computer program includes instructions, and when the instructions are executed by the one or more processors, the electronic device is enabled to perform the method in the method embodiment, for example, obtaining a first video frame, determining that the first video frame includes at least one target object, determining a cropping box by using the at least one target object as a center, and obtaining content in the cropping box and displaying the content as a second video frame indication. The electronic device provided in the present disclosure can provide an automatic target tracking function for a video. In a scenario such as a video call, video shooting, or self-broadcast, a scene moves with movement of a person, and a scene changes with movement of feet. The function can be implemented without configuring a hardware facility such as a pan-tilt-zoom, without a manual operation of a photographer, and without installing a dedicated image processing application. In other words, automatic image processing can be implemented, and intelligent recognition of a target object and automatic image processing are implemented without affecting video smoothness, thereby improving picture quality of video communication, and increasing intelligence of human-computer interaction.

DESCRIPTION OF EMBODIMENTS

The following describes the technical solutions in the embodiments of this disclosure with reference to the accompanying drawings in the embodiments of this disclosure. In description of the embodiments of this disclosure, "I" means "or" unless otherwise specified. For example, AB may represent A or B. In this specification, "and/or" describes only an association relationship for describing associated objects and represents that three relationships may exist. For example, A and/or B may represent the following three cases: Only A exists, both A and B exist, and only B exists.

The following terms "first" and "second" are merely intended for a purpose of description, and shall not be understood as an indication or implication of relative importance or implicit indication of the number of indicated technical features. Therefore, a feature limited by "first" or "second" may explicitly or implicitly include one or more features. In the description of the embodiment of this disclosure, unless otherwise stated, "a plurality of" means two or more than two.

First, an example electronic device 100 provided in the following embodiment of this disclosure is described.

Figure 1A:
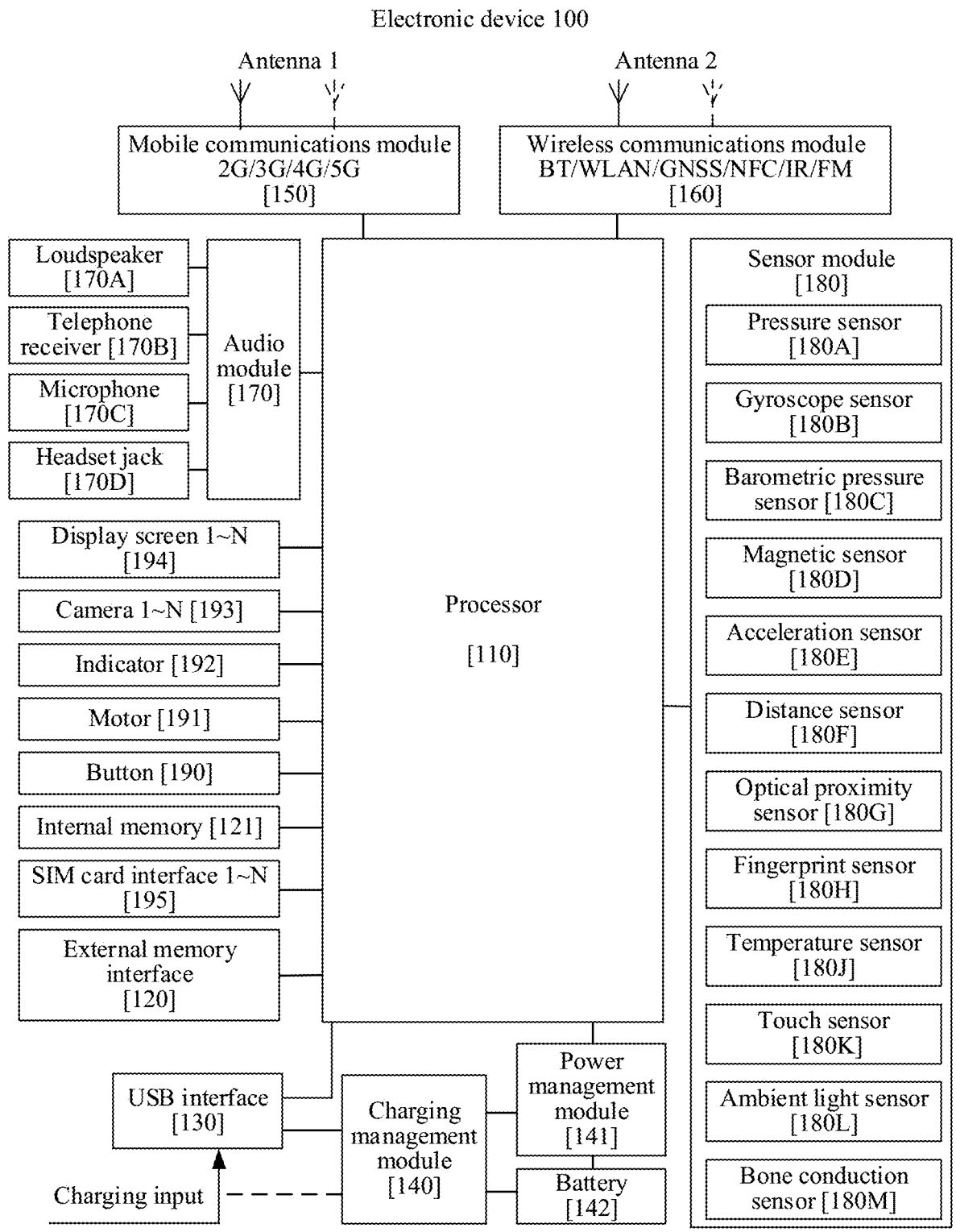
FIG. 1A is a structural diagram of an electronic device according to an embodiment of the present disclosure.

FIG. 1A is a schematic structural diagram of the electronic device 100.

The electronic device 100 is used as an example below to describe this embodiment in detail. It should be understood that the electronic device 100 shown in FIG. 1A is merely an example, and the electronic device 100 may include more or fewer components than those shown in FIG. 1A, may combine two or more components, or may have different component configurations. Various components shown in the figure may be implemented in hardware that includes one or more signal processing and/or application-specific integrated circuits, in software, or in a combination of hardware and software.

The electronic device 100 may include a processor 110, an external memory interface 120, an internal memory 121, a universal serial bus (USB) interface 130, a charging management module 140, a power management module 141, a battery 142, an antenna 1, an antenna 2, a mobile communications module 150, a wireless communications module 160, an audio module 170, a loudspeaker 170A, a telephone receiver 170B, a microphone 170C, a headset jack 170D, a sensor module 180, a button 190, a motor 191, an indicator 192, a camera 193, a display screen 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the schematic structure in this embodiment of the present disclosure constitutes no specific limitation on the electronic device 100. In some other embodiments of this disclosure, the electronic device 100 may include more or fewer components than those shown in the figure, or some components may be combined, or some components may be split, or components are arranged in different manners. The components shown in the figure may be implemented by using hardware, software, or a combination of software and hardware. For detailed structure description of the electronic device 100, refer to the previous patent application CN201910430270.9.

Figure 1B:
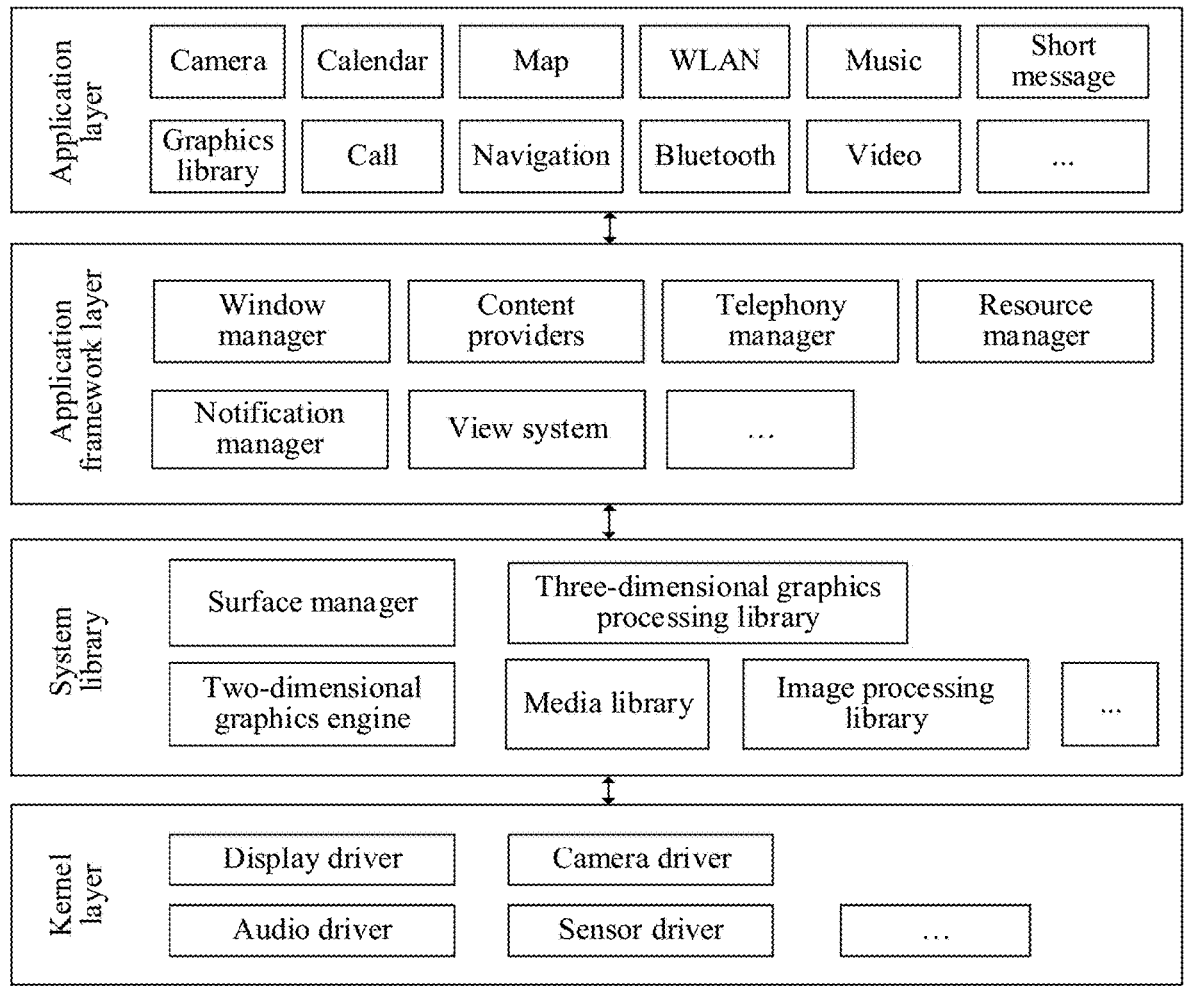
FIG. 1B is a software framework diagram according to an embodiment of the present disclosure.

FIG. 1B is a block diagram of a software structure of the electronic device 100 in this embodiment of this disclosure. In a layered architecture, software is divided into several layers, and each layer has a clear role and task. The layers communicate with each other over a software interface. In some embodiments, an Android system is divided into four layers that are respectively an application layer, an application framework layer, an Android runtime and system library, and a kernel layer from top to bottom. The application layer may include a series of application packages. For detailed description of a software function, refer to the previous patent application CN201910430270.9.

Figure 3:
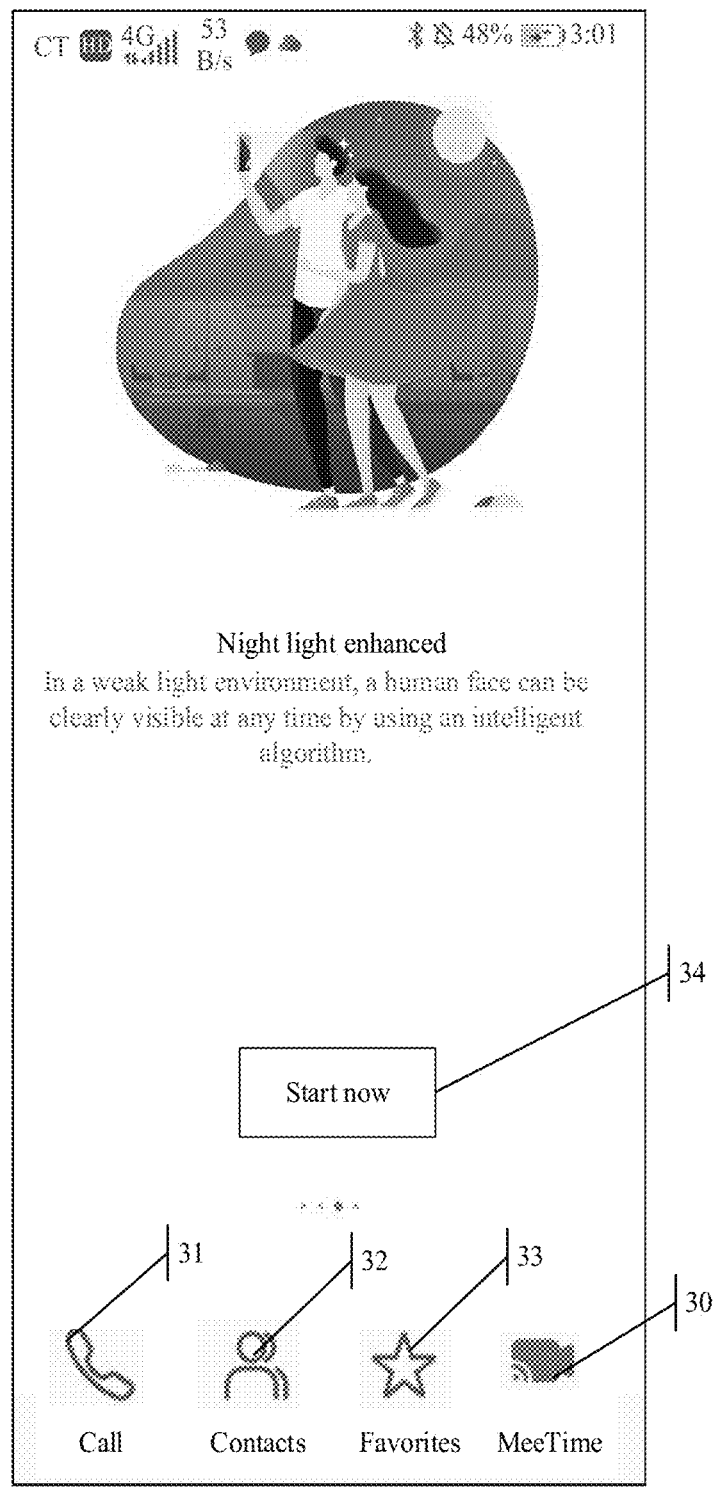
FIG. 3 is a schematic interface diagram of a system call application according to an embodiment of the present disclosure.
Figure 4:
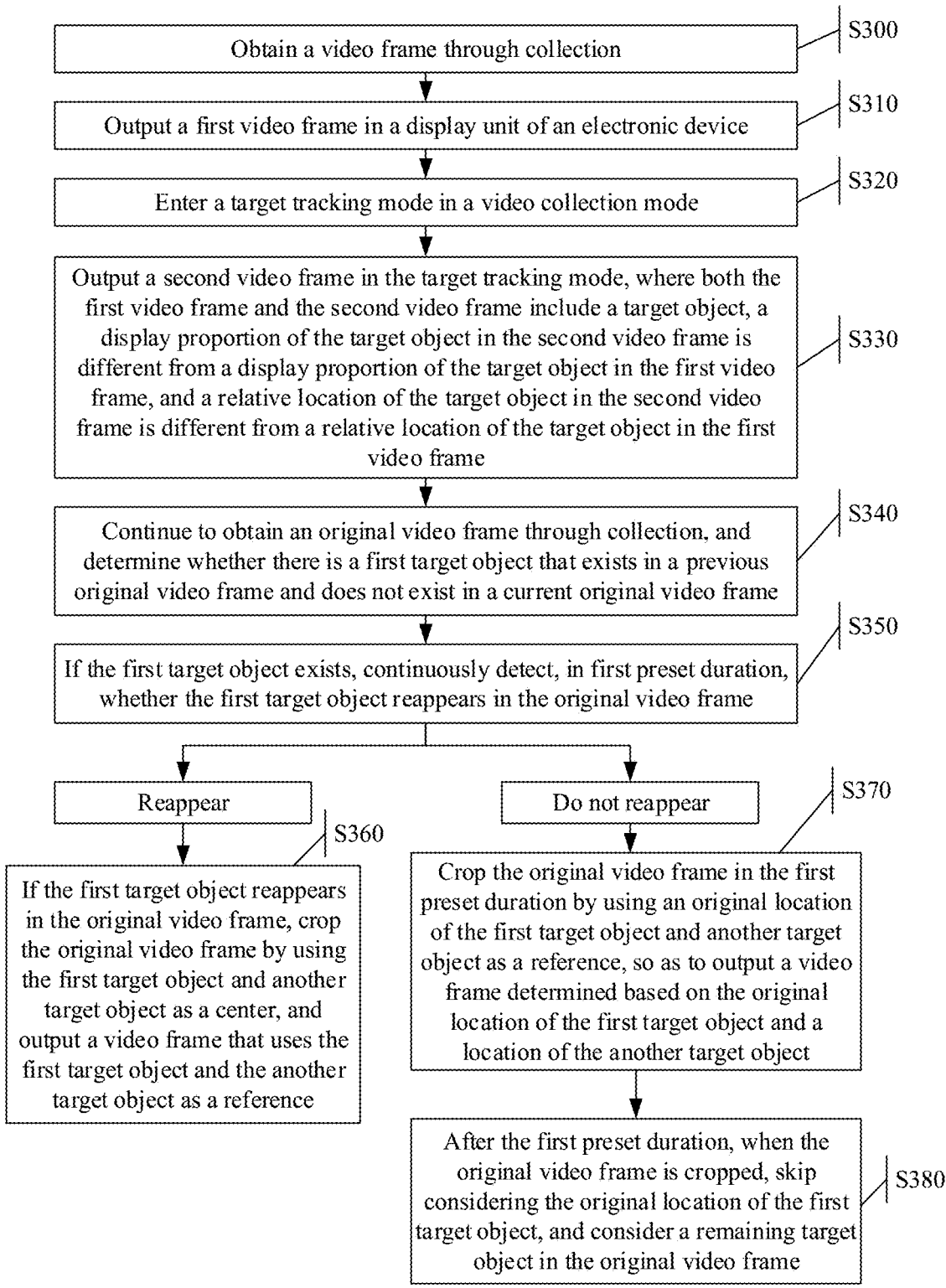
FIG. 4 is a flowchart of a video control method according to an embodiment of the present disclosure.

In a first aspect, an embodiment of the present disclosure provides a video collection control method, applied to an electronic device. The electronic device is an electronic device including no pan-tilt-zoom, so that a camera of the electronic device cannot rotate. Referring to FIG. 3, the method includes the following steps.

S200. Display a first video frame, where the first video frame includes a first target object; the first target object is located in a non-specified region in the first video frame; and when the first video frame is collected, the first target object is in a first geographical location.

S210. Display a second video frame in response to an operation of detecting entry into a target tracking mode, where the second video frame includes the first target object; the first target object is located in a specified region in the second video frame; and when the second video frame is collected, the first target object is in the first geographical location.

S220. Display a third video frame, where the third video frame includes the first target object; the first target object is located in a specified region in the third video frame; and when the third video frame is collected, the first target object is in a second geographical location, and a distance between the second geographical location and the first geographical location is greater than a preset distance.

In one implementation process, before the first video frame is displayed based on step S200, an original video frame needs to be obtained through collection, and an output video frame is obtained based on the original video frame obtained through collection. For example, the original video frame is directly output, or the output video frame is obtained after various processing is performed on the original video frame.

In one implementation process, a user may obtain, through collection, the original video frame by performing a video collection operation on a camera application (APP). For example, the user first opens the camera APP, and then taps a video collection button (the operation of tapping the video collection button is the video collection operation). After detecting the operation performed on the video collection button, the electronic device controls a camera to perform video collection to obtain the original video frame through collection.

The electronic device may alternatively obtain the original video frame through collection in a video chat process of the user. For example, if the user wants to perform video communication with a peer user by using an instant messaging APP, the user may enable instant messaging software (for example, WeChat or QQ), enter a chat interface of the contact, and then tap a "video communication" button. After detecting the operation of tapping the "video communication" button, the electronic device enables a function of video communication with the contact, and then enables the camera to obtain the original video frame through collection.

For another example, the user may perform a video chat with the peer user by using a default video chat function in a system. For example, referring to FIG. 3, a communication function of the electronic device includes a MeeTime function (the MeeTime function refers to a video communication function). After the user of the electronic device enables a system call application, a main interface of the system call application is displayed. The main interface of the system call application includes a telephone control 31, a contact control 32, a favorites control 33, and a MeeTime control 30. The telephone control 31 is configured to trigger the electronic device to display a recent call record, including all calls and missed calls. The contact control 32 is configured to trigger the electronic device to display all contact information of the call application. The personal favorites control 33 is configured to trigger the electronic device to add some contacts to personal favorites. By adding the contact to the personal favorites, quick communication may be performed with the contact, for example, quickly sending a short message or quickly making a call. The MeeTime control 30 is configured to trigger the electronic device to enable the video communication function.

In an optional implementation, the original video frame may be a video frame collected by using a front-facing camera or a rear-facing camera of the electronic device. In another optional implementation, the original video frame may be a video frame collected by another video collection device communicating with the electronic device. For example, if a data transmission channel exists between the electronic device and a security protection camera at home, the electronic device may obtain a video frame collected by the security protection camera; or if a data transmission channel exists between the electronic device and an unmanned aerial vehicle, the electronic device may obtain a video frame collected by the unmanned aerial vehicle. A video stream collected by the another video collection device may be registered as a virtual camera of the system. In a video call process, that the instant messaging software invokes the video frame collected by the virtual camera is considered as a video communication process.

In step S200, after the original video frame is obtained through collection, the original video frame may be directly output, and in this case, the original video frame is the first video frame. Alternatively, image processing (for example, beautification or cropping) may be performed on the original video frame, and then a processed video frame (the processed video frame is the first video frame, and so on) is output.

Figure 2:
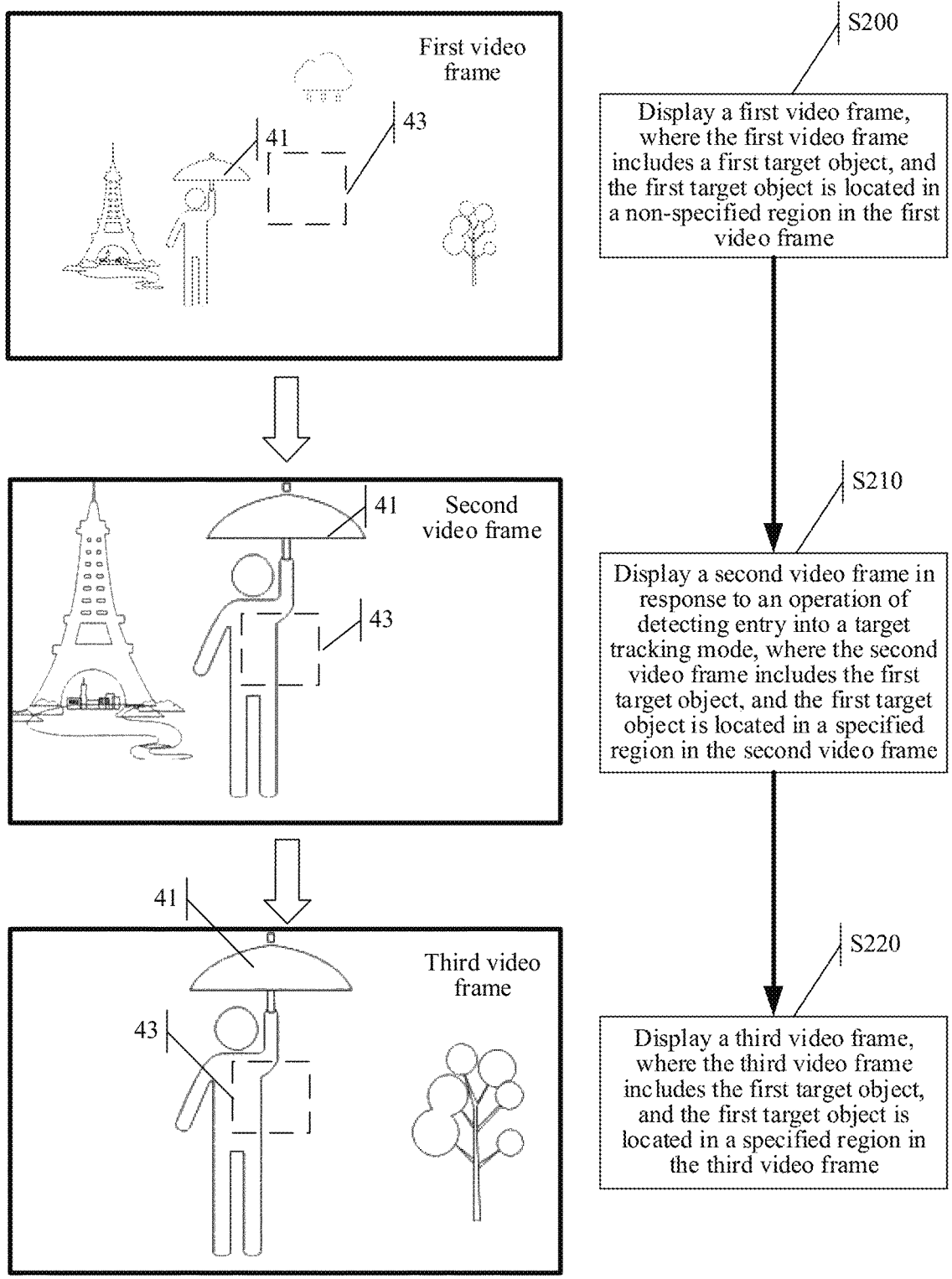
FIG. 2 is a flowchart of a video collection method in a first aspect according to an embodiment of the present disclosure.

In step S200, the first physical location may be any location, and may be represented by parameters such as a longitude, a dimension, and an altitude. The first target object may include one or at least two target objects. The non-specified region is another region other than a specified region 43 in the first video frame. For example, the specified region 43 is a center region, a golden ratio region, or any other region specified by the user of the electronic device. As shown in FIG. 2, the specified region 43 in FIG. 2 is a center region. The target object is located in the specified region 43, for example, a center point of the target object is located in the specified region 43. Alternatively, the target object is located in the non-specified region, for example, a center point of the target object is located in the non-specified region.

In step S210, in the target tracking mode, the output video frame may be obtained by cropping the collected original video frame, for example, the second video frame, the third video frame, and the like are obtained by cropping the original video frame.

As shown in FIG. 2, it can be learned that a geographical location of the first target object does not change in the second video frame, and is still in the first geographical location. However, the first target object is located in a center region (that is, the specified region 43) in the second video frame. The original image frame may be cropped by using the first target object as a reference, to obtain the second video frame. How to crop the original image frame by using the first target object as a reference is described subsequently.

In one implementation process, a display size of the first target object in the second video frame is greater than a display size of the first target object in the first video frame. For example, the display size of the first target object in the first video frame is 0.5 times or 0.6 times the display size of the first target object in the second video frame. A proportion of the display size of the first target object in the first video frame and a proportion of the display size of the first target object in the second video frame vary based on different widths of the first target object in the first video frame.

In step S210, after the target tracking mode is entered, the first target object needs to be first determined, so as to track the first target object in a subsequent video frame. The first target object may be determined in a plurality of manners, and two of the manners are listed below for description. Certainly, there are not only the following two cases in one implementation process.

In one implementation process, a target object in a video frame may be a target object automatically determined by the electronic device, or may be a target object determined based on a user operation. The two cases are separately described below. Certainly, there are not only the following two cases in one implementation process.

In a first case, the target object is automatically determined by the electronic device.

For example, after entering a subject tracking mode, the electronic device automatically determines the target object in the video frame based on a preset condition of the target object. For example, the preset condition is: all persons in the video frame, an animal in the video frame, or another active object in the video frame. For example, the preset condition is a person in the video frame. All the persons included in the video frame may be recognized based on a human body detection technology, and then all the persons are determined as target objects.

Alternatively, the preset condition is: a person (or an animal, another active object, or the like) that meets a tracking condition in the video frame, or a person meeting a tracking condition that a distance from a left edge an original video frame (that is, a video frame that is collected by the camera and whose size is not processed) is greater than a first preset distance and a distance from a right edge of the original video frame is greater than a second preset distance. The first preset distance may be the same as or different from the second preset distance. For example, the first preset distance or the second preset distance is 150 pixels or 200 pixels; or the first preset distance or the second preset distance is 0.1 times or 0.2 times an image width. Based on this solution, it can be ensured that a tracked target object is a person relatively located in the middle in a field of view of the camera. For example, a met tracking condition is that an area in the original video frame is greater than a preset area. For example, the preset area is 10,000 pixels or 20,000 pixels. In this case, a person (an animal or another active object) that is not completely collected in the original video frame or a person (or an animal or another active object) that is less prominent at an edge of the original video frame is not a tracked target object, so that video tracking is more specific.

In a second case, the target object is determined based on a user operation.

(1) The target object is determined based on a first preset operation of a user of the electronic device. For example, the video frame (which may be an original video frame or a processed video frame) is displayed in a display unit of the electronic device. The user taps a person in the video frame by using a finger, and the person is the target object after the electronic device detects the tap operation. For another example, if the user of the electronic device generates the following voice instruction: "following a person wearing a yellow dress in a picture", the electronic device recognizes the person wearing a yellow dress in the video frame, and determines the person as the target object, and so on.

(2) The target object is determined based on a second preset operation of a person in an original video frame. For example, the second preset operation is a tracking gesture, a voice instruction, or the like. For example, after obtaining the original video frame through collection, the electronic device recognizes each person in the original video frame by using a human body detection technology; then recognizes a joint point (for example, a head, a neck, a shoulder, a palm, a wrist, or an elbow joint) of each person by using a key point recognition technology, and determines, based on a location correspondence between the joint points, whether a tracking gesture exists. For example, the tracking gesture is raising a hand or making a finger heart. Whether a hand raising gesture exists may be determined by using whether the palm, the wrist, and the elbow joint are approximately located in a straight line, whether a vertical coordinate of the palm is higher than a vertical coordinate of the wrist, and whether the vertical coordinate of the wrist is higher than a vertical coordinate of the elbow joint. For another example, if the electronic device detects that a user in the video frame generates a voice instruction "follow me", the electronic device determines the user as the target object.

When the target object is determined based on a user operation, the user operation may also be an operation of triggering entry into the subject tracking mode. For example, after the electronic device enters a video collection mode, and does not enter the subject tracking mode by default or detect another operation of entering the subject tracking mode, after detecting a user operation used to acknowledge the target object, in response to the user operation, the electronic device not only enters the subject tracking mode, but also determines the target object.

Alternatively, when detecting a user operation used to determine the target object, the electronic device first determines whether the electronic device enters the subject tracking mode in a video collection process. If the electronic device enters the subject tracking mode in the video collection process, the electronic device determines the target object based on the user operation, and then performs subject tracking by using the target object as a center. If the electronic device does not enter the subject tracking mode in the video collection process, the electronic device makes no response to the user operation.

There may be one or at least two target objects determined in this embodiment of the present disclosure.

In step S220, because the electronic device receives no operation of exiting the target tracking mode, the electronic device still processes the target tracking mode. In the target tracking mode, a video frame displayed by the electronic device moves with movement of the first target object, so as to keep the first target object located in the specified location 43 in the video frame. Still referring to FIG. 2, it may be learned from FIG. 2 that in the third video frame, the first target object is far away from a tower and moves towards a tree. Therefore, there is a relatively large difference between a picture of the output third video frame and that of the output second video frame, but the first target object is still in the specified region 43 in the video frame.

In a second aspect, referring to FIG. 3, an embodiment of the present disclosure provides a video collection method, and the method includes the following steps.

S300. Obtain a video frame through collection.

In one implementation process, a user may obtain, through collection, the video frame by performing a video collection operation on a camera APP. For example, the user first opens the camera APP, and then taps a video collection button (the operation of tapping the video collection button is the video collection operation). After detecting the operation performed on the video collection button, an electronic device controls a camera to obtain the video frame through collection.

The electronic device may alternatively obtain the video frame through collection in a video chat process of the user. For example, if the user wants to perform video communication with a peer user by using an instant messaging APP, the user may enable instant messaging software (for example, WeChat or QQ), enter a chat interface of the contact, and then tap a "video communication" button. After detecting the operation of tapping the "video communication" button, the electronic device enables a function of video communication with the contact, and then enables a camera to obtain the video frame through collection.

For another example, the user may perform a video chat with the peer user by using a default video chat function in a system. For example, referring to FIG. 2, a communication function of the electronic device includes a MeeTime function (the MeeTime function refers to a video communication function). After the user of the electronic device enables a system call application, a main interface of the system call application is displayed. The main interface of the system call application includes a telephone control 31, a contact control 32, a favorites control 33, and a MeeTime control 30. The telephone control 31 is configured to trigger the electronic device to display a recent call record, including all calls and missed calls. The contact control 32 is configured to trigger the electronic device to display all contact information of the call application. The personal favorites control 33 is configured to trigger the electronic device to add some contacts to personal favorites. By adding the contact to the personal favorites, quick communication may be performed with the contact, for example, quickly sending a short message or quickly making a call. The MeeTime control 30 is configured to trigger the electronic device to enable the video communication function.

In this embodiment of the present disclosure, the video frame may be a video frame collected by using a front-facing camera or a rear-facing camera of the electronic device, or may be a video frame collected by another video collection device communicating with the electronic device. For example, if a data transmission channel exists between the electronic device and a security protection camera at home, the electronic device may obtain a video frame collected by the security protection camera; or if a data transmission channel exists between the electronic device and an unmanned aerial vehicle, the electronic device may obtain a video frame collected by the unmanned aerial vehicle. A video stream collected by the another video collection device may be registered as a virtual camera of the system. In a video call process, that the instant messaging software invokes the video frame collected by the virtual camera is considered as a video communication process.

S310. Output a first video frame in a display unit of an electronic device.

Figure 5A:
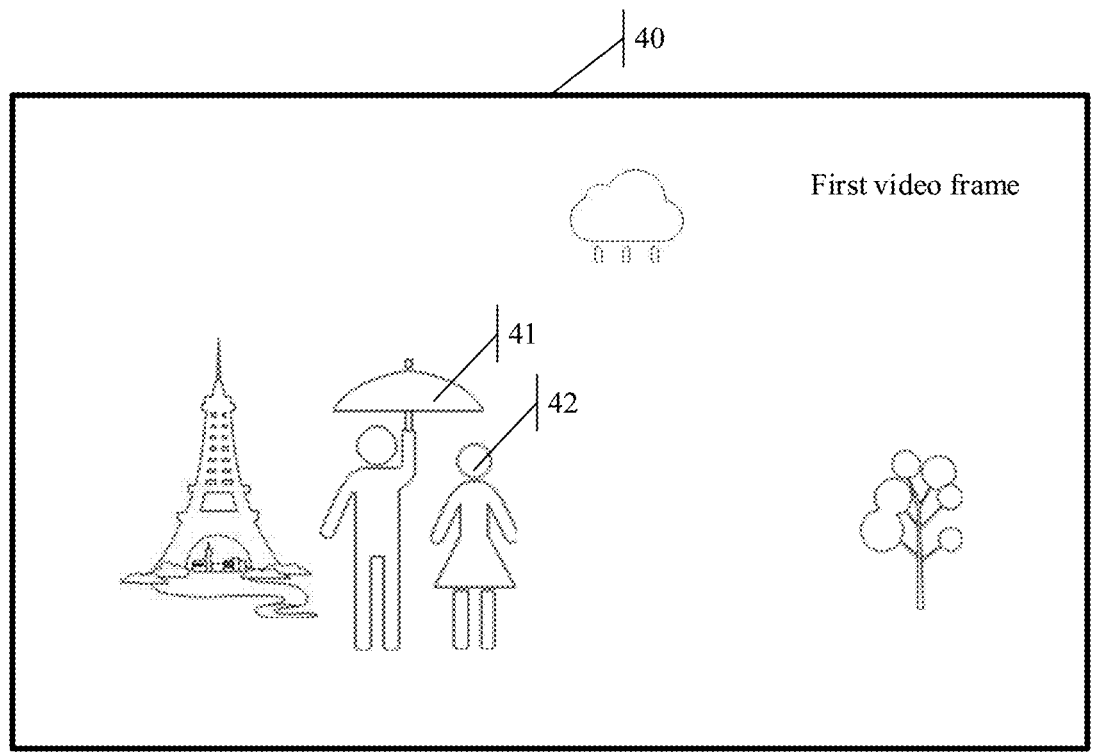
FIG. 5A is a schematic diagram of a first video frame according to an embodiment of the present disclosure.

FIG. 5A is a schematic diagram of the first video frame that is output by the electronic device, and 40 is an outer box border of the output video frame. If this solution is applied to a video collection process, outputting the first video frame is, for example, outputting the first video frame in a video preview interface of the display unit so that a user previews the first video frame. If this solution is applied to a video communication process, outputting the first video frame is, for example, transmitting the first video frame to a peer electronic device, and displaying the first video frame in a video communications interface.

In an optional embodiment, a spotlight mode may be set in the video collection process, and a spotlight effect may be set for a specific object in the spotlight mode, that is, highlighting the specific object, for example, setting the spotlight effect (setting a highlight) for the specific object, controlling color display of the specific object, displaying content other than the specific object in black and white, displaying content other than the specific object in a blurring manner, or adding a special effect to the specific object.

In one implementation process, the specific object may be determined in a plurality of manners, and two of the manners are listed below for description. Certainly, there are not only the following two cases in one implementation process.

In a first manner, the specific object is determined by performing a selection operation on the specific object in the video frame. For example, the selection operation is a tap operation or a slide operation. A user may select one specific object, or may select a plurality of specific objects. For example, the user may select a plurality of specific objects by using a plurality of selection operations, or the user may select a plurality of specific objects by using one operation. For example, the user simultaneously selects two specific objects by using two fingers with each finger corresponding to one target.

In a second manner, a sound source is located by using a microphone of the electronic device, and a person in a region in which the sound source is located is determined as the specific object. For example, this solution may be applied to a multi-person discussion scenario or a multi-person singing scenario. For example, the video frame includes a person A 40, a person B 41, a person C 42, and a person D 43. The five persons discuss a problem. At a first moment, the person B 41 speaks. In this case, the person B 41 is determined as the specific object, and the spotlight effect is added to the person B 41. At a second moment, the person D 43 speaks. In this case, the person D 43 is determined as the specific object, the spotlight effect is added to the person D 43, and the spotlight effect of the person B is canceled, and so on. A current speaker can be determined by locating the specific object.

In a third manner, all persons included in the video frame are determined by using a human body recognition technology, and a person in the middle is determined as the specific object. For example, the video frame includes a person A, a person B, a person C, a person D, and a person E. After recognizing locations of the five persons, the electronic device determines that the person C is in the middle, and therefore determines the person C as the specific object.

In a fourth manner, a voice instruction of a user is received, and the specific object is determined by using the voice instruction. For example, a user of the electronic device says "setting a spotlight effect for a person in the middle", and in this case, it is determined that the specific object is the person in the middle (for example, a person C). For another example, a user of the electronic device says "setting a spotlight effect for a highest person", and in this case, it is determined that the specific object is the highest person in the video frame.

In a fifth manner, gesture recognition is performed on a person collected in the video frame, and a person using a preset gesture is determined as the specific object. For example, the preset gesture is raising a hand, swinging a hand, or the like.

In one implementation process, an operation of entering the spotlight mode may be first detected and then the specific object is determined, or the specific object may be first determined and then an operation of entering the spotlight mode is detected, so as to generate the spotlight effect for the specific object. This is not listed in detail and not limited in this embodiment of the present disclosure.

S320: Enter a subject tracking mode in a video collection mode.

In one implementation process, a picture of a video frame that is output in the subject tracking mode moves with movement of a target object, so that the target object is at a center location of the picture of the video frame, or the target object is at a golden ratio location of the video frame, a location specified by a user, or the like. The target object may be a person, an animal, another moving object (for example, a kite, a car, or a robot cleaner), or the like.

After entering a video collection state, the electronic device may enter the subject tracking mode in response to a preset operation. For example, the preset operation is an operation of tapping a preset button displayed by the display unit, an operation of selecting a specific person in the video frame, or an operation of generating a preset gesture by a person in the video frame.

In one implementation process, after entering the video collection state, the electronic device may enter the subject tracking mode by default.

S330. Output a second video frame in the subject tracking mode, where both the first video frame and the second video frame include a target object, a display proportion of the target object in the second video frame is different from a display proportion of the target object in the first video frame, and a relative location of the target object in the second video frame is different from a relative location of the target object in the first video frame.

In an optional embodiment, the display proportion of the target object in the second video frame is greater than the display proportion of the target object in the first video frame. For example, a width of the target object in the second video frame occupies more than 50% of a total picture width, a width of the target object in the first video frame occupies 20% of the total picture width, a height of the target object in the second video frame occupies more than 50% of a total picture height, and a height of the target object in the first video frame occupies 30% of the total picture height. Certainly, the proportions of the width and the height are merely used as examples and are not limited.

The relative location of the target object in the second video frame is different from a relative location of the target object in the first video frame. For example, a second ratio corresponding to the second video frame is different from a first ratio corresponding to the first video frame, the second ratio is a ratio of a distance between a left box border 50a of the target object in the second video frame and a left box border of the second video frame to a width of the second video frame, and the first ratio is a ratio of a distance between a left box border 50a of the target object in the first video frame and a left box border 50a of the first video frame to a width of the first video frame. For another example, the second ratio is a ratio of a distance between a right box border 50b of the target object in the second video frame and a right box border of the second video frame to a width of the second video frame, and the first ratio is a ratio of a distance between a right box border 50b of the target object in the first video frame and a right box border of the first video frame to a width of the first video frame. In an optional implementation, if the spotlight mode is entered in step S300, the spotlight mode may be maintained when S330 is entered, and the spotlight effect is still generated for the specific object determined in S300. In another optional embodiment, after the subject tracking mode is entered, the spotlight mode may be further maintained, but a specific object having the spotlight effect is adjusted, for example, the specific object is adjusted to a target object in the subject tracking mode. In another optional embodiment, the spotlight mode and the subject tracking mode are a plurality of parallel modes. After it is detected that the subject tracking mode is entered, the spotlight mode is exited.

In an optional embodiment, if the spotlight mode is not entered before S330, the spotlight mode may still be entered after S330 without exiting the subject tracking mode. This is not listed in detail and not limited in this embodiment of the present disclosure.

Figure 5B:
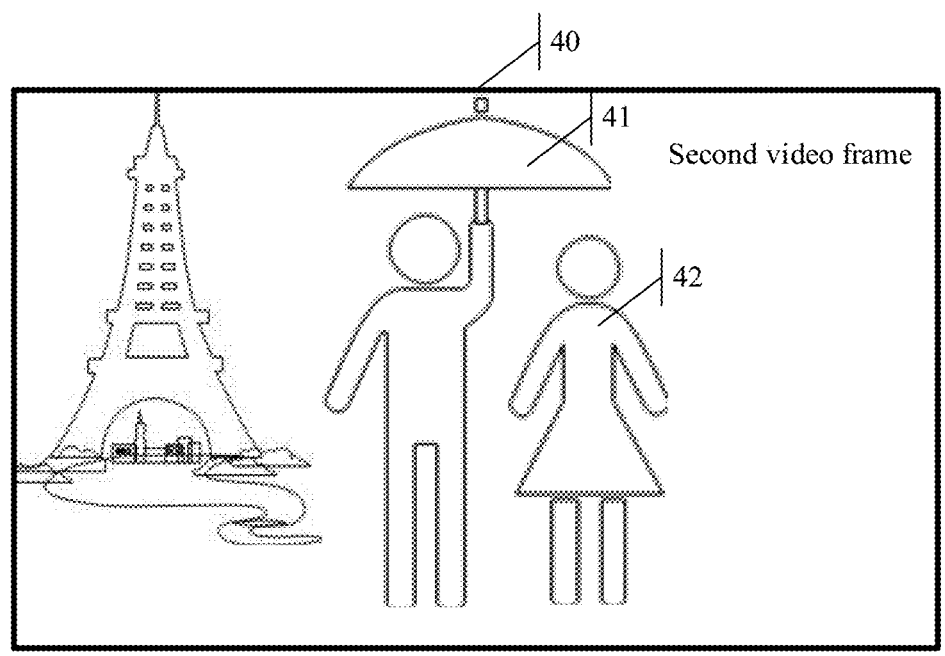
FIG. 5B is a schematic diagram of a second video frame according to an embodiment of the present disclosure.

In an optional embodiment, to ensure that no sudden picture change occurs when switching is performed between the first video frame and the second video frame, smoothing processing may be performed between the first video frame and the second video frame. For example, a plurality of transition video frames further exist between the first video frame and the second video frame. For example, there are 10 or 20 transition video frames. In one implementation process, the target object may be a person, an animal, another moving object (for example, an unmanned aerial vehicle, a toy car, or a balloon), or the like in the video frame. FIG. 5A is used as an example. For example, target objects included in the first video frame are a person 41 and a person 42, and the output second video frame is, for example, shown in FIG. 5B. It may be learned from FIG. 5A and FIG. 5B that after the subject tracking mode is entered, a display region of the target object (the person 41 and the person 42) in the video frame is enlarged, and a relative location of the target object in the video frame changes. In the first video frame, the target object is located in a left part of a picture, and in the second video frame, the target object is located in a middle part of the picture.

In one implementation process, a target object in a video frame may be a target object automatically determined by the electronic device, or may be a target object determined based on a user operation. This is described above, and details are not described herein again.

Figure 5C:
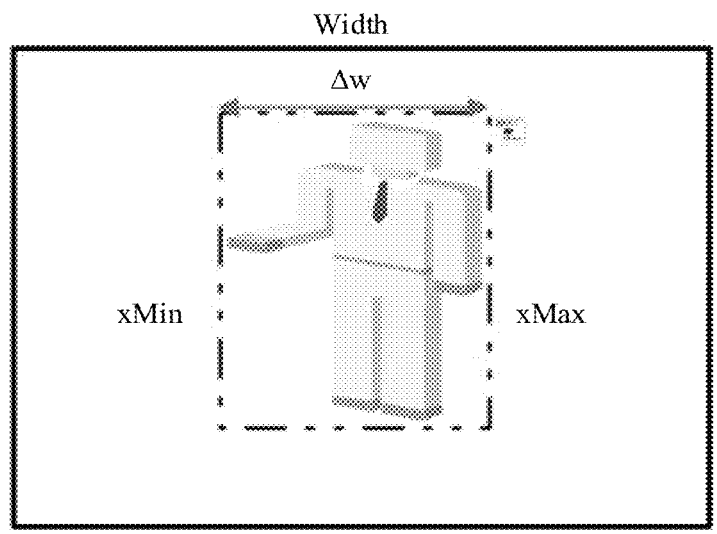
FIG. 5C is a schematic diagram of a coordinate box of a single person according to an embodiment of the present disclosure.
Figure 5D:
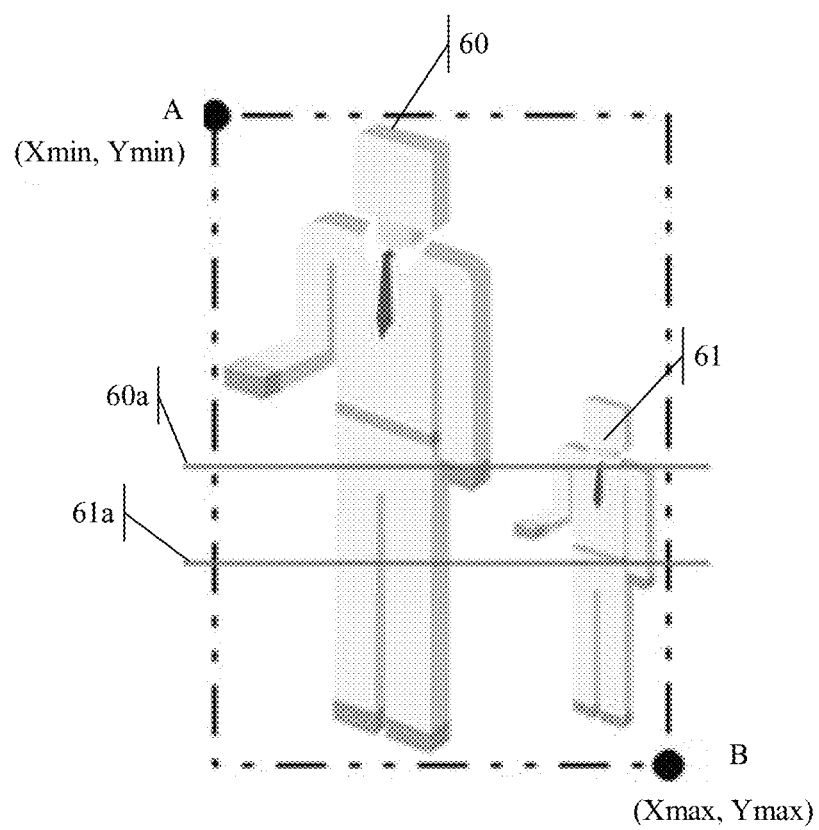
FIG. 5D is a schematic diagram of a coordinate box of two persons according to an embodiment of the present disclosure.

In one implementation process, the output second video frame may be obtained by cropping an original video frame. For example, the target object is a person. A coordinate box 50 of a human body may be first determined by using a human body detection model, and then a cropping box 81 for cropping the video frame is determined by using the coordinate box 50. The coordinate box 50 may be represented by coordinates of each point in the coordinate box 50, may be represented by coordinates in an upper left corner plus coordinates in a lower right corner, may be represented by coordinates in a lower left corner plus coordinates in an upper right corner, and so on. FIG. 5C is a schematic diagram of a determined coordinate box 50 when there is one target object, and FIG. 5D is a schematic diagram of a determined coordinate box 50 when the target object is two persons (a case of a plurality of persons is similar to this). Coordinate boxes 50 of all persons in the original video frame may be first determined based on a human body detection technology, and then the coordinate boxes 50 of all the persons are combined to obtain the coordinate box 50 of the target object. In FIG. 5D, the coordinate box 50 is represented by coordinates (Xmin, Ymin) in an upper left corner and coordinates (Xmax, Ymax) in a lower right corner. Xmin represents a minimum value on an X-axis, Ymin represents a minimum value on a Y-axis, Xmax represents a maximum value on the X-axis, Ymax represents a maximum value on the Y-axis, and an upper left corner of the video frame is an origin.

When the coordinate box 50 of the target object is determined, only the target object may be considered without considering another thing attached to the target object, for example, a held umbrella, a hat that is worn, or a bicycle that is rode. However, to consider picture integrity, another thing attached to the target object may be further considered when the target object is determined.

In one implementation process, the cropping box 81 may be determined in a plurality of manners, and several of the manners are listed below for description. Certainly, there are not only the following several cases in one implementation process.

Figure 6:
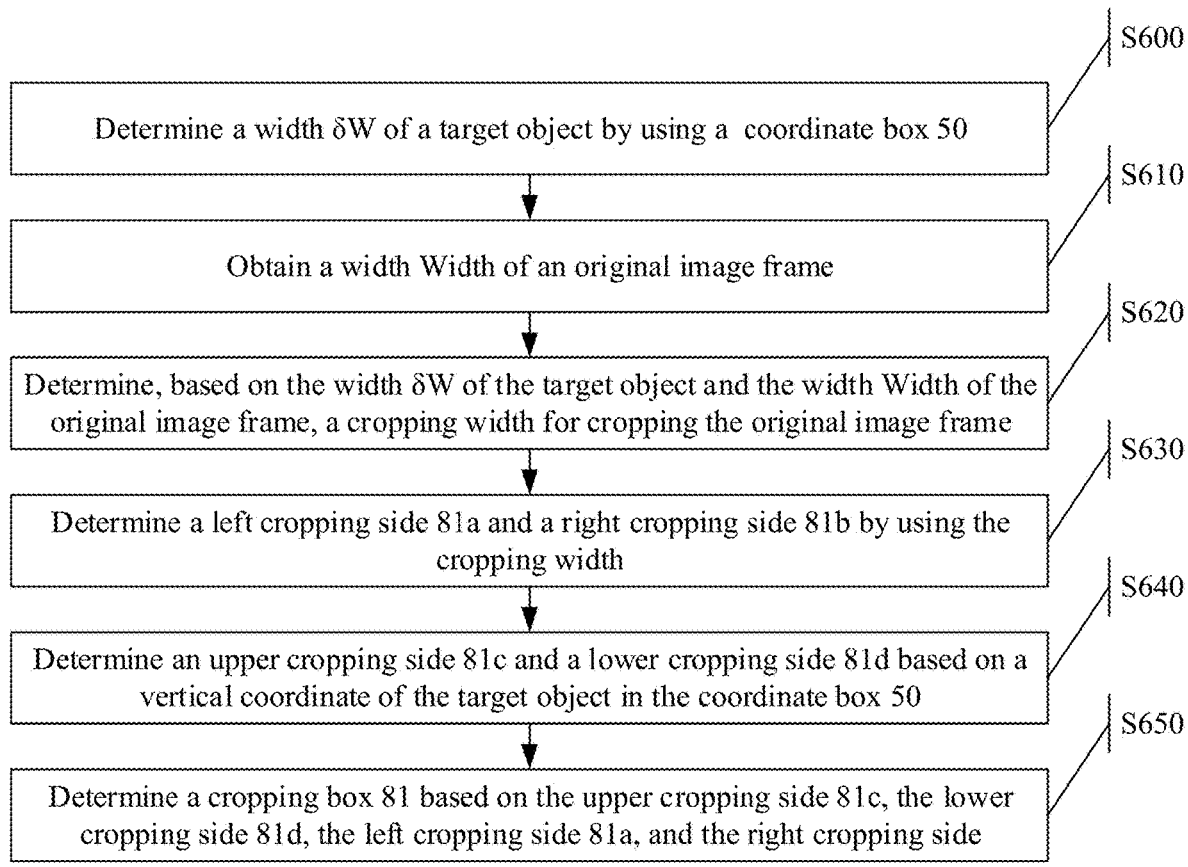
FIG. 6 is a flowchart of a first manner of determining a cropping box according to an embodiment of the present disclosure.

In a first manner, referring to FIG. 6, the cropping box 81 for cropping the original video frame may be determined in the following manner.

S600. Determine a width δW of the target object by using the coordinate box 50.

For example, referring to FIG. 5C and FIG. 5D, the width δW of the target object may be obtained by subtracting Xmin from Xmax.

S610. Obtain a width Width of the original image frame.

S620. Determine, based on the width δW of the target object and the width Width of the original image frame, a cropping width for cropping the original image frame.

Figure 7:
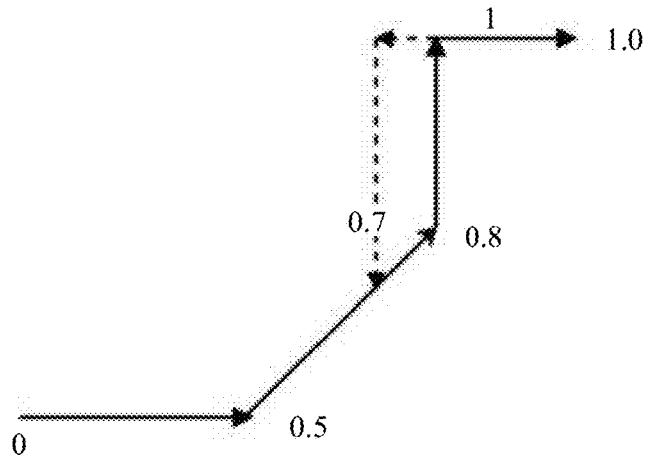
FIG. 7 is a correspondence between a cropping width and $\delta W/Width$ according to an embodiment of the present disclosure.

In one implementation process, the cropping width may be determined by using a ratio of the width δW of the target object to the width Width of the image. For example, referring to FIG. 7, when δW/Width is less than or equal to a first preset ratio, the cropping width is the first preset ratio multiplied by the width of the original image frame. When δW/Width is greater than the first preset ratio and less than or equal to a second preset ratio, the cropping width is the width δW of the target object. When δW/Width is greater than the second preset ratio, the cropping width is Width. For example, the first preset ratio is 0.3 or 0.5, and the second preset ratio is 0.6 or 0.8. Certainly, the first preset ratio may be another value. This is not listed in detail and not limited in this embodiment of the present disclosure.

S630. Determine a left cropping side 81a and a right cropping side 81b by using the cropping width.

For example, it is assumed that the first preset ratio is 0.5 and the second preset ratio is 0.8. In this case, when δW is less than or equal to 0.5, the cropping width is 0.5 times the width of the original image frame. When δW is greater than 0.5 and less than or equal to 0.8, the cropping width is δW. When δW is greater than 0.8, the cropping width is the width of the original image frame.

Figure 8A:
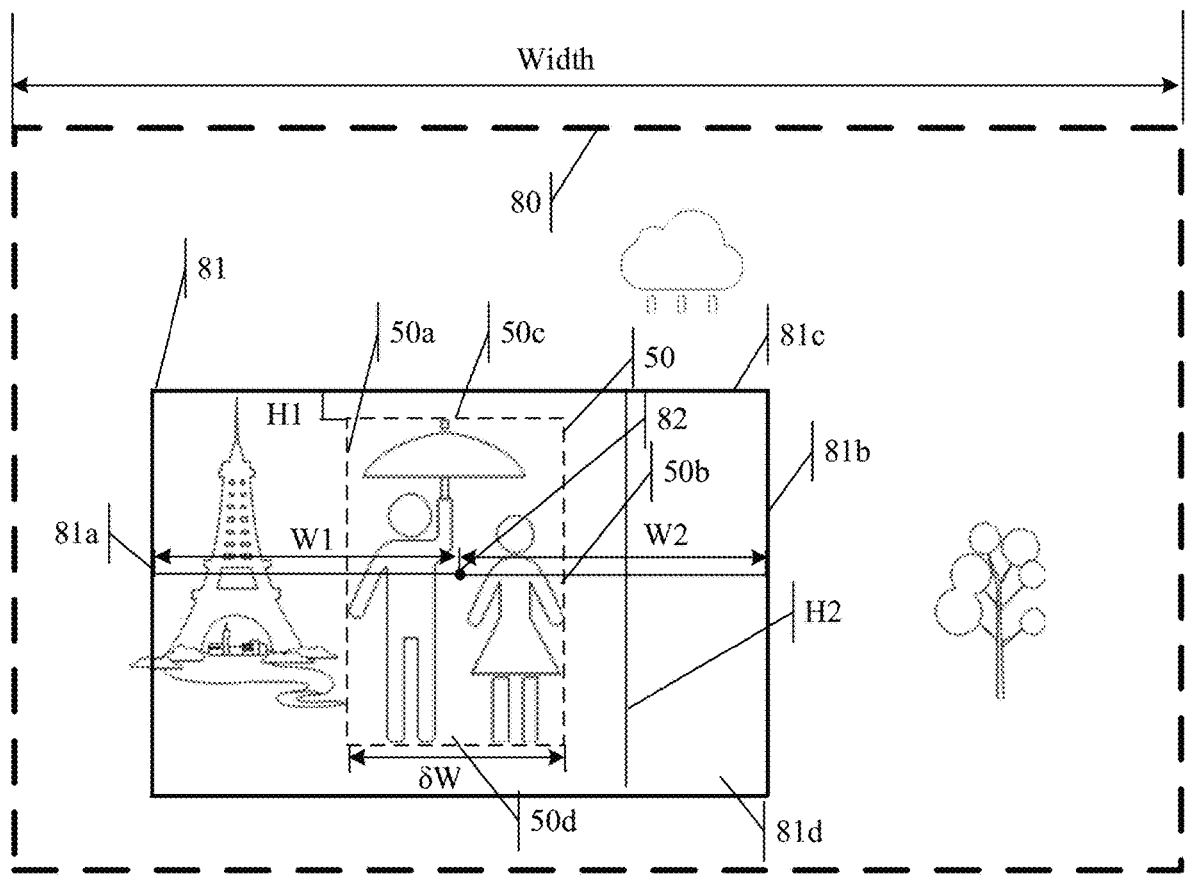
FIG. 8A to FIG. 8C are schematic diagrams of a first manner of determining a cropping box according to an embodiment of the present disclosure.

For example, it is assumed that the original image frame is shown in FIG. 8A. In FIG. 8A, 80 represents an outer box border of the original video frame, 50 represents the coordinate box of the target object, and the coordinate box 50 includes a left box border 50a, a right box border 50b, an upper box border 50c, and a lower box border 50d. Because δW/Width is less than 0.5, it is determined that the cropping width is 0.5 times the width Width of the original video frame. A center point 82 of the target object may be determined by using the coordinate box 50, and coordinates of the center point 82 may be obtained through calculation by using the following formula:

$X \text{ center point} = (X\text{max} + X\text{min})/2$ $Y \text{ center point} = (Y\text{max} + Y\text{min})/2$ The X center point refers to a coordinate of the center point in an X-axis direction, and the Y center point refers to a coordinate of the center point in a Y-axis direction. Only the X center point may be determined, or both the X center point and the Y center point may be determined.

After the center point is determined, the center point is extended leftwards by a first preset width W1, and a straight line perpendicular to the X-axis direction is made to determine the left cropping side 81a. The center point is extended rightwards by a second preset width W2, and a straight line perpendicular to the X-axis direction is made to obtain the right cropping side 81b. A sum of the first preset width W1 and the second preset width W2 is the cropping width, for example, the sum of the first preset width W1 and the second preset width W2 is 0.5 multiplied by Width. The first preset width W1 may be equal to the second preset width W2, and both the first preset width W1 and the second preset width W2 are ½ of the cropping width, for example, ¼*Width. The first preset width W1 may be unequal to the second preset width W2. This is not limited in this embodiment of the present disclosure.

Figure 8B:
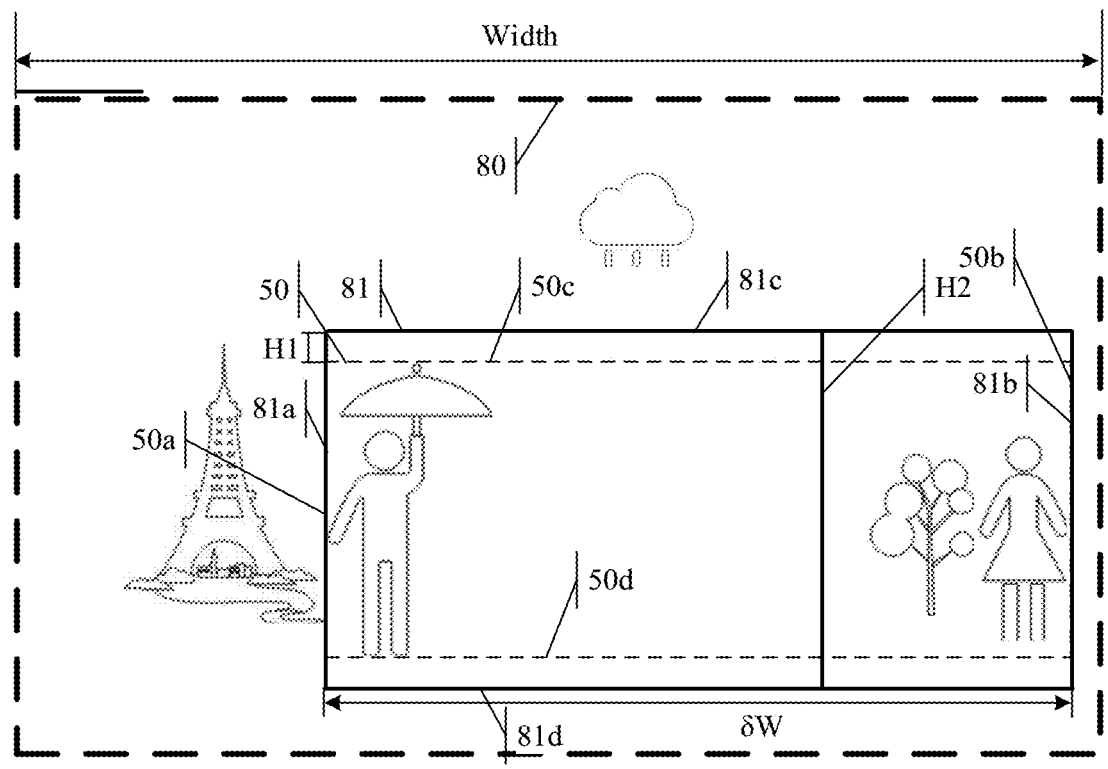

Referring to FIG. 8B, assuming that δW/Width=0.6 in FIG. 8B, the cropping width is equal to W. In this case, the left box border 50a of the coordinate box 50 may be used as the left cropping side 81a, and the right box border 50b of the coordinate box 50 may be used as the right cropping side 81b.

Figure 8C:
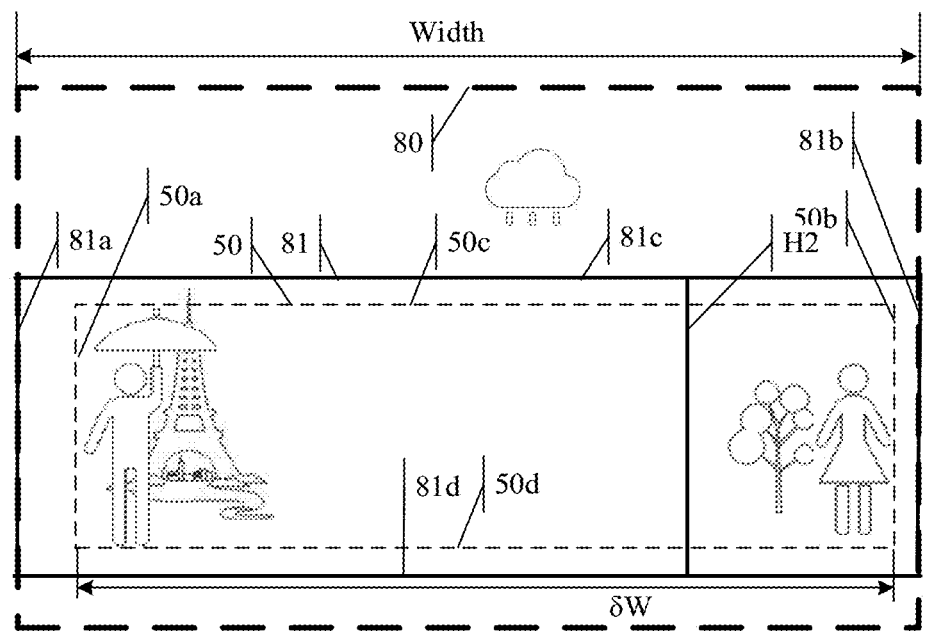

Referring to FIG. 8C, assuming that δW/Width=0.85 in FIG. 8C, the cropping width is Width. In this case, a left box border of the original video frame is the left cropping side 81a, and a right box border of the original video frame is the right cropping side 81b.

S640. Determine an upper cropping side 81c and a lower cropping side 81d based on a vertical coordinate of the target object in the coordinate box 50.

For example, the upper box border 50c may be used as the upper cropping side 81c after being moved upwards by a first preset height H1 (in one implementation process, the upper box border 50c may be directly used as the upper cropping side 81c). The upper cropping side 81c is used as the lower cropping side 81d after being extended downwards by a second preset height H2. For example, the first preset height H1 is 0.05 times or 0.01 times (or which certainly may be another value) a height of the original image frame, and the second preset height H2 is 0.5 times or 0.6 times (or which certainly may be another value) the height of the original image frame, (as shown in FIG. 8A to FIG. 8C).

In one implementation process, the lower box border 50d may be directly used as the lower cropping side 81d. The lower box border 50d may be used as the lower cropping side 81d after being extended downwards by a specific distance.

In one implementation process, the upper cropping side 81c may be determined by extending the center point 82 upwards by a preset height, and the lower cropping side 81d may be determined by extending the center point 82 downwards by a preset height (a manner of determining the upper cropping side 81c and the lower cropping side 81d is similar to a manner of determining the left cropping side 81a and the right cropping side 81b, and details are not described herein again).

In one implementation process, a cropping height may be determined based on a proportion of the width of the original video frame that is occupied by the cropping width, and the upper cropping side 81c and the lower cropping side 81d are determined based on the cropping height. A manner of determining the upper cropping side 81c and the lower cropping side 81d is similar to a manner of determining the left cropping side 81a and the right cropping side 81b based on the cropping width, and details are not described herein again. Based on this solution, it can be ensured that the original video frame is cropped in equal ratios, so that when the original video frame meets an aspect ratio of a display region of a video frame, the cropping box 81 does not need to be adjusted to meet an aspect ratio of a real region.

S650. Determine the cropping box 81 based on the upper cropping side 81c, the lower cropping side 81d, the left cropping side 81a, and the right cropping side 81b. It may be learned from FIG. 8A to FIG. 8C that a size of the finally determined cropping box 81 varies based on different widths δW of the target object, so that a picture of an output video frame may also occupy different sizes of a picture of the original video frame. Before the subject tracking mode is entered, the first video frame usually occupies a fixed proportion of the original video frame, for example, the first video frame is 100% or 90% of the original image frame. Therefore, based on different widths δW of the target object, a picture of the second video frame also occupies different proportions of a picture of the first video frame.

If the target object is one person, δW may be different due to different distances between the target object and a camera (the electronic device). As a result, the picture of the second video frame also occupies different proportions of the first video frame. Alternatively, if the target object is a plurality of persons, δW may be different due to different distances between the target object and a camera and different distances between the two persons. As a result, the picture of the second video frame also occupies different proportions of the first video frame.

Optionally, to ensure a smooth transition between image frames, the center point 82 of the target object may be jointly determined by selecting a previous preset frame and a subsequent preset frame of a current frame. For example, a center point of each of the current frame, the previous preset frame (for example, 10 frames or 15 frames), and the subsequent preset frame (for example, 15 frames or 20 frames) is determined, and then an average value of the center points of all the frames are calculated to obtain the center point 82 of the current frame.

Figure 9:
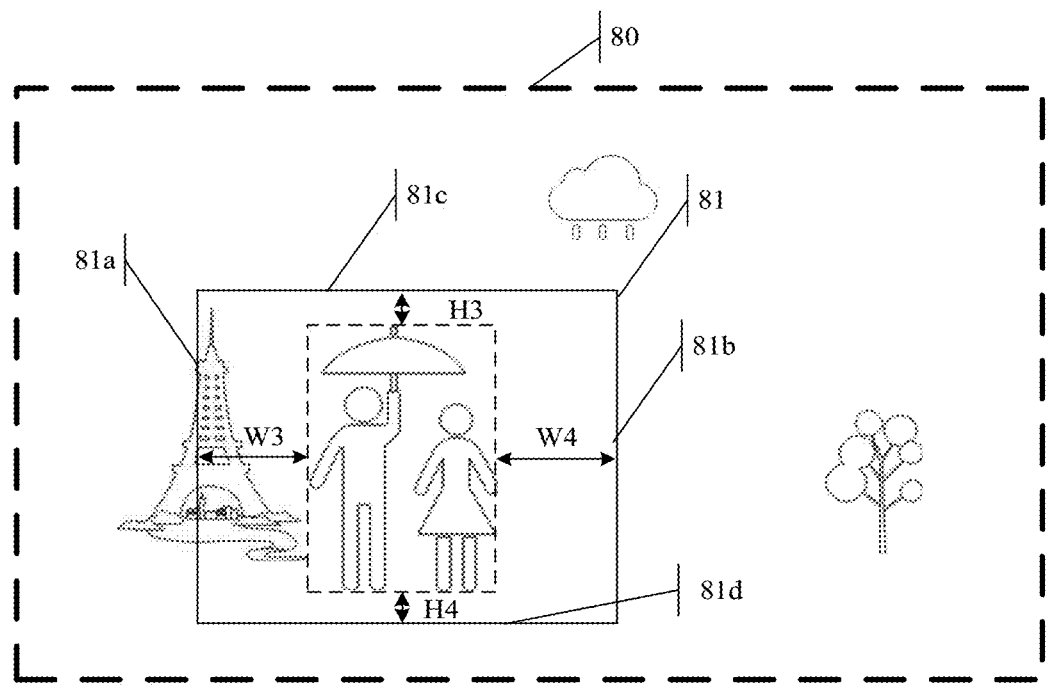
FIG. 9 is a schematic diagram of a second manner of determining a cropping box according to an embodiment of the present disclosure.

In a second manner, referring to FIG. 9, after the coordinate box 50 of the target object is determined, the left box border 50a is moved leftwards by a third preset width W3 to obtain a left cropping side 81a (in one implementation process, the left box border 50a may be directly used as the left cropping side 81a). The right box border 50b is moved rightwards by a fourth preset width W4 to obtain a right cropping side 81b (in one implementation process, the right box border 50b may be directly used as the right cropping side 81b). The upper box border 50c is used as an upper cropping side 81c after being moved upwards by a third preset height H3 (in one implementation process, the upper box border 50c may be used as the upper cropping side 81c). The lower box border 50d is used as a lower cropping side 81d (in one implementation process, the lower box border 50d may be moved downwards by a fourth preset height H4 to obtain the lower cropping side 81d). The cropping box 81 for cropping the original video frame is determined by using the upper cropping side 81c, the lower cropping side 81d, the left cropping side 81a, and the right cropping side 81b.

The third preset width W3, the fourth preset width W4, the third preset height H3, and the fourth preset height H4 may be completely the same, partially the same, or completely different. For example, the width and the height each are 100 pixels, 200 pixels, or 300 pixels, each are 0.1 times or 0.2 times the width of the original video frame, or each are 0.05 times or 0.15 times the height of the original video frame.

By using the foregoing solution, it can be ensured that the target object is tracked by using the target object as a center in a video collection process.

Figure 10:
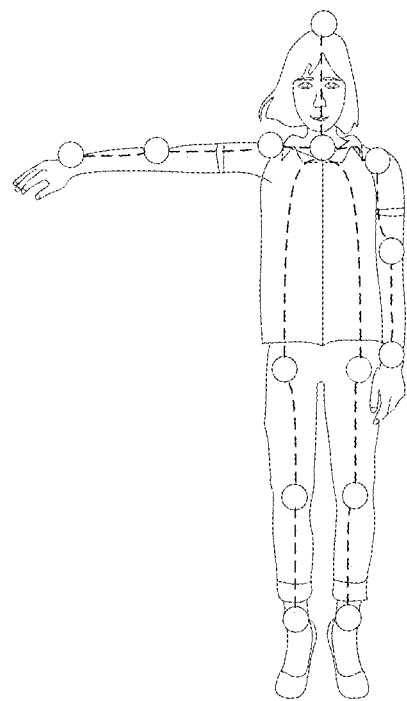
FIG. 10 is a schematic diagram of a detected joint point of a human body according to an embodiment of the present disclosure.

In a third manner, a lower cropping side 81d may be determined in the following manner: A preset joint point closest to the lower box border 50d is determined, and a cropping location corresponding to the preset joint point is used as the lower cropping side 81d. For example, the preset joint point is an ankle joint, a knee joint, or a hip joint. A joint point of a person may be determined by using a key point detection algorithm. For example, the key point recognition technology is a Pictorial Structure algorithm, a top-down key point detection algorithm, or a bottom-up key human body point detection algorithm. The determined joint point is shown in FIG. 10.

In one implementation process, the cropping location is usually obtained by moving the preset joint point upwards by a preset distance. For example, the preset distance is: (1) a fixed value, such as 30 pixels or 40 pixels; (2) a specific proportion of a total human body height, such as $\frac{1}{20}$ or $\frac{1}{30}$ of the total human body height; (3) a specific proportion of a total video frame height, such as $\frac{1}{40}$ or $\frac{1}{50}$; or (4) a specific proportion of a distance between a current joint point and a previous specific joint point, such as $\frac{1}{3}$ or $\frac{1}{4}$. As shown in FIG. 10, if the current joint point is an ankle joint, the previous specific joint point is, for example, a knee joint; if the current joint point is a knee joint, the previous specific joint point is, for example, a hip joint; or if the current joint point is a hip joint, the previous specific joint point is, for example, an elbow joint, and so on.

For another manner of determining a cropping side, refer to the first and the second manners, and details are not described herein again.

In a fourth manner, a lower cropping side 81d may be determined in the following manner: The cropping box 81 is determined based on a historical operation record of a user for a video (and/or an image). For example, a cropping box that a user mostly likes to use is determined based on a historical collection record or a historical cropping record of the user for a video (and/or an image), for example, a distance between the target object in the cropping box and each box border of the video frame.

Optionally, after the cropping box 81 is determined, the cropping box 81 may be further adjusted. In one implementation process, a plurality of adjustment manners may be used, and several of the manners are listed below for description. Certainly, there are not only the following several cases in one implementation process.

In a first manner, a preset joint point closest to the lower cropping side 81d is determined, a cropping location corresponding to the preset joint point is determined, and the lower cropping side 81d is moved to the cropping location. For example, the preset joint point is an ankle joint, a knee joint, or a hip joint. A joint point of a person may be determined by using a key point detection algorithm. For example, the key point recognition technology is a Pictorial Structure algorithm, a top-down key point detection algorithm, or a bottom-up key human body point detection algorithm. The determined joint point is shown in FIG. 9

(which is specific to the first and second manners of determining the cropping box 81).

Figure 11:
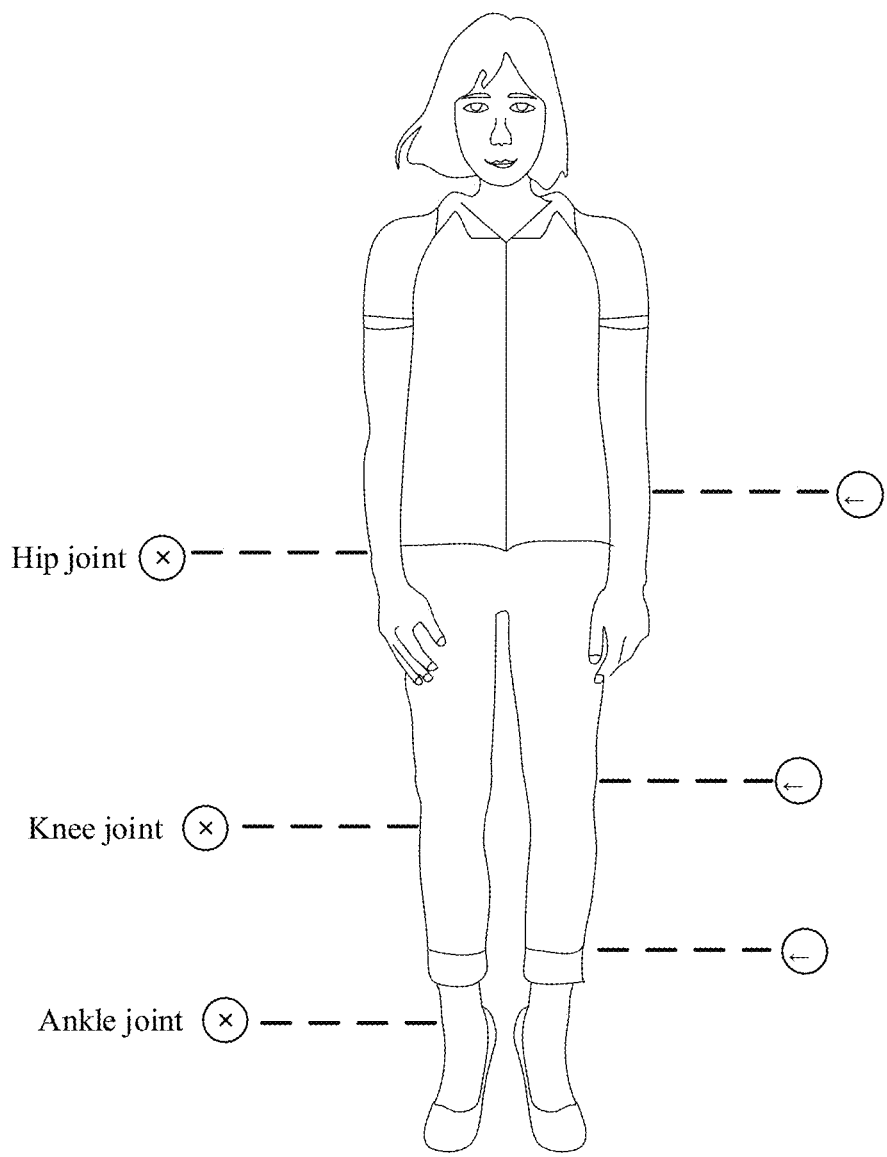
FIG. 11 is a schematic diagram of a correspondence between a joint point and a cropping location according to an embodiment of the present disclosure.

In an implementation, the cropping location is usually obtained by moving the preset joint point upwards by a preset distance. For example, the preset distance is: (1) a fixed value, such as 30 pixels or 40 pixels; (2) a specific proportion of a total human body height, such as 1/20 or 1/30 of the total human body height; (3) a specific proportion of a total video frame height, such as 1/40 or 1/50; or (4) a specific proportion of a distance between a current joint point and a previous specific joint point, such as 1/3 or 1/4. As shown in FIG. 11, if the current joint point is an ankle joint, the previous specific joint point is, for example, a knee joint; if the current joint point is a knee joint, the previous specific joint point is, for example, a hip joint; or if the current joint point is a hip joint, the previous specific joint point is, for example, an elbow joint, and so on.

In a second manner, an image cut-off location is determined based on historical operation data of a user for a video (and/or an image), and the lower cropping side 81d is adjusted based on the image cut-off location. The historical operation data may include historical video (image) collection data, historical video (image) operation data, and the like.

For example, an image may be pre-divided into a plurality of human body cut-off regions based on a joint point of a human body, appearance duration of each image cut-off region in a video frame historically collected by a user is determined, a favorite image cut-off region (an image cut-off region with longest appearance duration) of the user is determined based on the appearance duration of each image cut-off region, and the lower cropping side 81d is adjusted based on the image cut-off region.

In an embodiment, a collected video may be split into a plurality of frames of images, and then an image cut-off region of each image is determined in combination with another image collected in the electronic device, an image cut-off region appearing a maximum quantity of times is determined, and the lower cropping side 81d is adjusted based on the image cut-off region.

In an embodiment, a video cropped by a user may be split into a plurality of frames of images, and then an image cut-off region of each image is determined in combination with another image in the electronic device that is cropped by the user, an image cut-off region appearing a maximum quantity of times is determined, and the lower cropping side 81d is adjusted based on the image cut-off region.

A plurality of manners may be used when the lower cropping side 81d is adjusted based on the image cut-off region, and two of the manners are listed below for description. Certainly, there are not only the following two cases in one implementation process.

(1) A correspondence between the image cut-off region and the lower cropping side 81d may be preset, for example, as shown in Table 1.

TABLE 1

| Image cut-off region | Lower cropping side 81d |
| --- | --- |
| Region below an ankle joint | Preset location between the ankle joint and a knee joint |
| Region (excluding an ankle joint) above the ankle joint and below a knee joint | Preset location between the knee joint and a hip joint |
| Region (excluding a knee joint) above the knee joint and below a hip joint | Preset location between the hip joint and an elbow joint |
| Region (excluding a hip joint) above the hip joint and below an elbow joint | Preset location between the elbow joint and a neck joint |

TABLE 1-continued

| Image cut-off region | Lower cropping side 81d |
| --- | --- |
| Above an elbow joint (excluding the elbow joint) | Not adjusted |
| Outside a coordinate box 50 of a human body (that is, feet are completely located in a video frame) | Not adjusted |

After the image cut-off region is determined, a corresponding lower cropping side 81d is determined by using the correspondence, and the determined lower cropping side 81d of the cropping box 81 is adjusted based on the determined lower cropping side 81d.

(2) After the image cut-off region is determined, it may be determined whether the lower cropping side 81d is located in the image cut-off region. If the lower cropping side 81d is located in the image cut-off region, a lower cut-off box border does not need to be adjusted. If the lower cropping side 81d is not located in the image cut-off region, the lower cut-off box border may be adjusted to the image cut-off region.

In one implementation process, before the lower cropping side 81d is adjusted based on the image cut-off region, a quantity of target objects in the video frame may be first determined. When the quantity of target objects is not greater than a preset threshold (such as 1 or 2), the lower cropping side 81d is adjusted by using the image cut-off region. If the quantity of target objects is greater than the preset threshold, the lower cropping side 81d does not need to be adjusted by using the image cut-off region. Based on this solution, when there is an excessively large quantity of targets, it can be avoided that excessive content in some target objects is cropped when the lower cropping side 81d is determined by using this solution.

Optionally, before the lower cropping side 81d is adjusted based on the image cut-off region, a motion amount of a current video frame relative to a previous frame may be further determined. When the motion amount is less than a preset motion amount, the lower cropping side 81d is adjusted by using the image cut-off region. If the motion amount is not less than the preset motion amount, the lower cropping side 81d is not cropped by using the image cut-off region point. For example, the preset motion amount is as follows: A motion amount on a horizontal coordinate is less than a preset proportion of a video frame width (such as 0.02 or 0.025), and a motion amount on a vertical coordinate is less than a preset proportion of a video frame height (such as 0.025 or 0.03). Based on this solution, a large-scale motion of a target object in a video frame and an unsmooth video transition that may be caused by adjustment of the lower cropping side 81d based on the image cut-off region can be prevented.

In a third manner, after the cropping box 81 is determined, it may be further determined whether an aspect ratio of the cropping box 81 meets a preset ratio (for example, 16:9 or 4:3). When the aspect ratio of the cropping box 81 does not meet the preset ratio, the cropping box 81 may be further adjusted, so that the aspect ratio of the cropping box 81 meets the preset ratio. For example, if the aspect ratio is less than the preset ratio, the aspect ratio may be made to meet the preset ratio by increasing a width; or if the aspect ratio is greater than the preset ratio, the aspect ratio may be made to meet the preset ratio by increasing a height. Certainly, the cropping box 81 may be adjusted in another manner, so that the aspect ratio meets the preset threshold. This is not listed and not limited in this embodiment of the present disclosure.

If this solution is applied to a video communication process, the electronic device may obtain an aspect ratio of a display screen (or a video display region) of a peer electronic device, and determine the preset ratio based on the aspect ratio.

In a fourth manner, when the video frame includes a plurality of target objects, if the lower cropping side 81d is determined by extending the upper cropping side 81c downwards by a second preset height H2, the method further includes the following: A center line of each target object is determined, and then it is determined whether the lower cropping side 81d is located below the center lines of all the target objects. If the lower cropping side 81d is not located below the center lines of all the target objects, the lower cropping side 81d is moved downwards until the lower cropping side 81d is located below the center lines of all the target objects. For example, the center line is a line that is made in parallel to an X-axis by using a midpoint of a vertical coordinate of each target object as a reference, or a line that is made in parallel to an X-axis by using a hip joint of each target object as a reference. Still referring to FIG. 5D, the figure includes two target objects that are respectively a target object 60 and a target object 61, a center line of the target object 60 is 60a, and a center line of the target object is 61a. In this case, the determined lower cropping side 81d should be located below the center line 61a of the target object 61.

In one implementation process, when the lower cropping side is adjusted based on a center line of each target object, the method further includes the following: A relative distance between a first preset key point of a first target object and the first preset key point of a second target object is determined. It is determined whether the relative distance is greater than a preset threshold. If the relative distance is greater than the preset threshold, the first center line and the second center line are determined.

For example, the first preset key point is a head or a neck of a target object. In this case, the first preset key point of the first target object is a head of the first target object, and the first preset key point of the second target object is a neck of the second target object. For example, the preset threshold is: (1) a fixed value, such as 30 pixels, 40 pixels, or 50 pixels; (2) a preset proportion of a total height of the first target object or the second target object, such as ¼ or ⅕; or (3) a preset proportion of a pre-cropping box, such as ¼ or ⅙.

In a fifth manner, it is determined whether a center line of a first pre-cropping box is located below a center line of a first target object. If the center line of the first pre-cropping box is not located below the center line of the first target object, an upper cropping side of the first pre-cropping box is moved upwards by a second preset distance, and a lower cropping side of the first pre-cropping box is moved downwards by a third preset distance, to obtain the first cropping box. A finally output video frame is content in the first cropping box.

In one implementation process, the second preset distance may be the same as or different from the third preset distance. For example, the distance is: (1) a fixed value, such as 30 pixels or 40 pixels; (2) a specific proportion of a total human body height, such as ¹⁄₂₀ or ¹⁄₃₀ of the total human body height; (3) a specific proportion of a total video frame height, such as ¹⁄₄₀ or ¹⁄₅₀; or (4) a specific proportion of the first pre-cropping box, such as ⅓ or ¼. In a process of tracking a target object based on the subject tracking mode, a tracked target object may be further re-selected or switched, and several switching manners are listed below for description.

Figure 12:
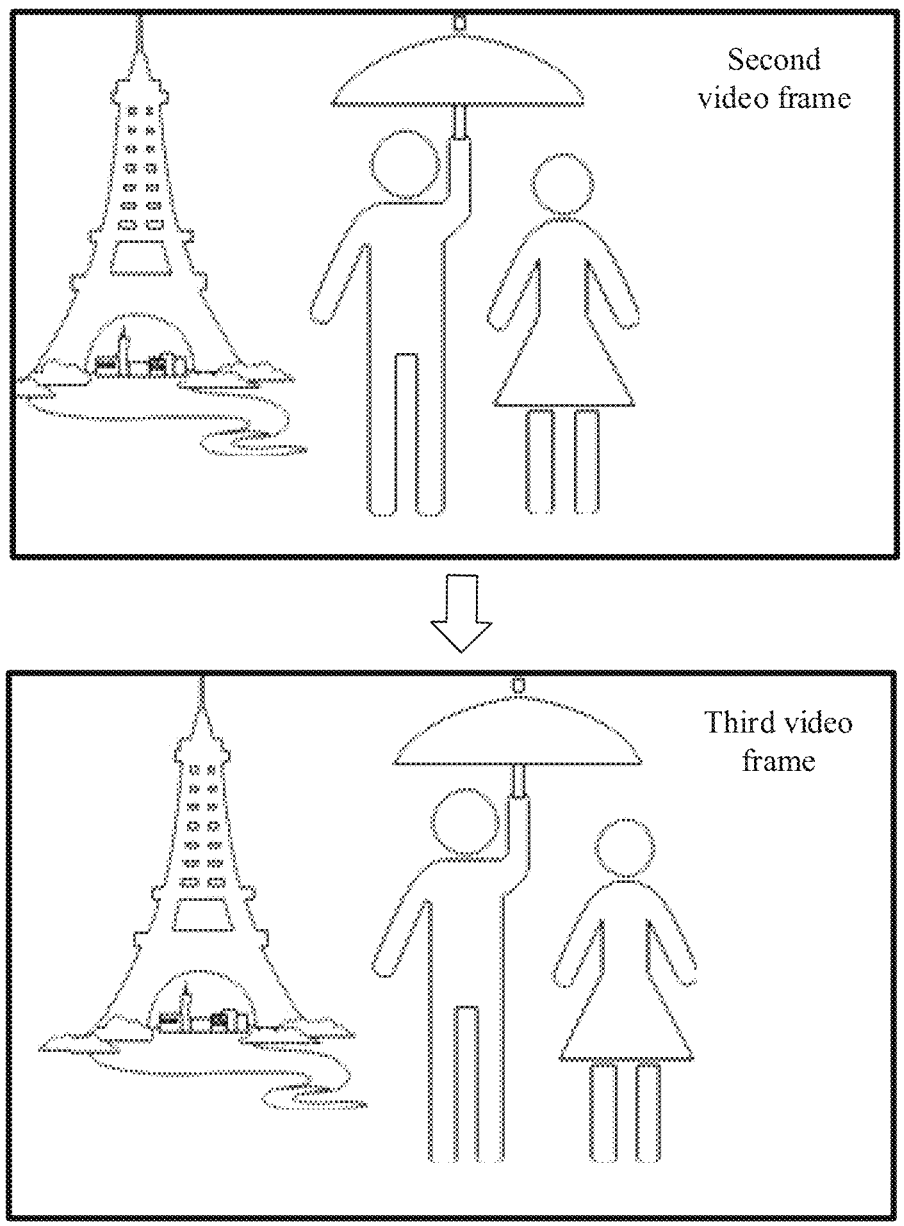
FIG. 12 is a schematic diagram of a third video frame that is output after a target object is adjusted according to an embodiment of the present disclosure.

(1) If a touch display unit of the electronic device receives a tap operation for a first object, the electronic device controls the first object to be used as the target object, and cancels another target object. For example, an original video frame is shown in FIG. 8A. Previous target objects are the person 41 and the person 42. After a tap operation for the person 41 is detected, the person 41 is still used as the target object, and using of the person 42 as the target object is canceled. In this case, the electronic device outputs a third video frame. When a target object in the second video frame is not displaced, a location of the first object in the third video frame is different from a location of a second object in the second video frame. As shown in FIG. 12, in the second video frame and the third video frame, the target object 41 is not displaced, but a relative location of the target object 41 in a picture of the video frame changes.

When detecting an operation of tapping, in the touch display unit, a region in which the person 41 is located, the electronic device crops the original video frame by using the person 41 as the target object. In this case, even if the original video frame includes the person 42, 42 is not considered during cropping. In this case, the third video frame is output, and the location of the first object in the third video frame is different from the location of the second object in the second video frame, although content in an original video frame of the third video frame is the same as content in an original video frame of the second video frame.

(2) If a first object in the video frame generates a tracking operation, it is determined whether the first object is a target object determined based on a user operation. If the first object is the target object determined based on the user operation, a default subject tracking mode is restored; or if the first object is not the target object determined based on the user operation, the first object is used as the target object, and another target object is cancelled. For example, restoring the default subject tracking mode is restoring a subject tracking mode in which a target subject automatically determined by the electronic device is tracked.

For example, the user operation is a tap operation or a voice instruction of a user of the electronic device, or a preset gesture or a voice instruction of a user in the video frame. Based on the user operation, the first object can be determined as the target object, and another target object can be canceled (as shown in case (1)).

Case (1) is continuously described. Currently, the person 41 is determined as the target object based on the tap operation of the user, and the person 42 is canceled to be the target object. In this case, if it is further detected that the person 41 generates the tracking operation (for example, raising a hand or making a finger heart), the default subject tracking mode is restored, and both the person 41 and the person 42 are determined as target objects.

In addition, after it is detected that the first object generates the tracking operation, if duration of an interval at which it is detected again that the first object generates the tracking operation is greater than preset duration (for example, one second or two seconds), it is determined that the tracking operation is a valid operation, and the electronic device may respond to the tracking operation. If the duration is not greater than the preset duration, it is determined that the tracking operation is an invalid operation, and the electronic device makes no response to the tracking operation.

For example, in an initial phase, the person 41 is not the target object determined by the user operation. If the electronic device detects the tracking operation (for example, raising a hand or making a finger heart) of the person 41 in the video frame, the electronic device determines the person 41 as the target object, and crops current and subsequent original video frames by using the person 41 as a reference (for example, a center or a golden ratio), so that an output video frame is a video frame that is output by using the person 41 as a reference. After the electronic device finds that an interval between a time of the current operation and that of the previous operation is only 0.3 seconds after detecting the tacking operation of the person 41 again, the electronic device determines that the current operation is an invalid operation, and still crops the original video frame by using the person 41 as a center. Subsequently, if the electronic device detects the tracking operation of the person 41 again, and finds that an interval between a time of the current operation and that of the previous operation is seven seconds, the electronic device determines that the current operation is a valid operation, uses the person 41 and the person 42 as target objects together, and restores the default subject tracking mode.

(3) When a first object is used as a target object determined by a user operation, if a tap operation for the first object is detected in a touch display unit of the electronic device, the first object is remained as the target object (in this case, another target object is still cancelled).

(4) When a first object is used as a target object determined by a user operation, if it is detected first object in the original video frame generates a tracking operation, using of the first object as the target object is cancelled.

Optionally, if an operation that triggers the first object to be used as the target object is the tracking operation, when the tracking operation is detected again, it is first determined whether the tracking operation is a valid operation. If the tracking operation is a valid operation, a default subject tracking mode is restored; or if the tracking operation is an invalid operation, the first object is remained as the target object.

The person 42 is used as an example. If the electronic device detects an operation of tapping the person 42 in a touch display unit, the electronic device controls the person 42 to be used as the target object. Subsequently, the electronic device detects that the person 42 in the original video frame generates the tracking operation. In this case, the default subject tracking mode is restored, and the person 41 and the person 42 are used as target objects. However, in an initial phase, if the electronic device detects the tracking operation of the person 42 in the original video frame, the electronic device controls the person 42 to be used as the target object, and cancels using of the person 41 as the target object. Subsequently, if the electronic device detects the tracking operation of the person 42 in the original video frame again, the electronic device first determines whether the tracking operation is a valid operation, and restores the default subject tracking mode when the tracking operation is a valid operation, or remains the person 42 as the target object if the tracking operation is an invalid operation.

(5) When a first object is used as a target object determined based on a user operation, if an operation of controlling a second object to be used as the target object is detected, the target object is switched from the first object to the second object. For example, the operation of controlling the second object to be used as the target object is an operation of tapping, in a touch display unit of the electronic device, a region in which the second object is located, or a tracking operation generated by the second object in the video frame.

For example, when the person 42 (the first object) is used as the target object (the person 41 is not the target object), the electronic device detects an operation of tapping, in the touch display unit, a region in which the person 41 (the second object) is located. In this case, the electronic device uses the person 41 as the target object, and cancels using of the person 2 as the target object. When the original video frame is subsequently cropped, the person 41 is used as a reference (for example, a center or a golden ratio) without considering a location of the person 42. Therefore, an output video frame is a video frame that uses the second object (the person 41) as a center or a golden ratio. For another example, when the person 42 is used as the target object determined by the user operation, the electronic device detects that the person 41 in the original video frame has a tracking operation (for example, raising a hand). In this case, the electronic device cancels using of the person 42 as the target object, and uses the person 41 as the target object.

(6) After an operation for a first region in a touch display unit is detected, if it is determined that the first region is a blank region, a default subject tracking mode is restored. The blank region is a region in which there is no target object, or the blank region is a region in which there is no target object or another moving object.

The switching processes (1) to (6) are specific to a scenario in which a single target object is re-selected or switched. A plurality of target objects may also be selected or switched, and several manners are listed below for description. Certainly, there are not only the following several cases in one implementation process.

(1) A region selection operation in a touch display unit is received, a selected region is determined in response to the region selection operation, and an object located in the selected region is used as the target object. For example, the region selection operation is: drawing a closed region (for example, a circle or a box), and using an object located in the closed region as the target object. For another example, the region selection operation is a line-drawing operation, and an object through which a line-drawing path of the line-drawing operation passes is used as the target object.

(2) A tracking operation generated by each person in the original video frame is detected. If an interval of times at which any two adjacent persons in the plurality of persons generate the tracking operation is less than a preset time interval (for example, two seconds or three seconds), the plurality of persons are determined as target objects.

For example, the original video frame includes five persons that are respectively a person A, a person B, a person C, a person D, and a person E. If a hand raising operation of the person A in the original video frame is first detected, the person A is used as the target object. After one second, if a hand raising operation of the person C in the original video frame is detected, the person C and the person A are used together as target objects. After another one second, if a hand raising operation of the person D in the original video frame is detected, the person A, the person C, and the person D are used together as target objects.

(3) In response to a voice instruction of a user, a plurality of persons are used as target objects based on the voice instruction.

For example, the original video frame includes five people that are respectively a person A, a person B, a person C, a person D, and a person E from left to right. A user of the electronic device generates the following voice instruction: "tracking a first person, a third person, and a fourth person from left to right". In response to the voice instruction, the electronic device first recognizes the five persons included in the original video frame, and then determines that from left to right, the first person is the person A, the third person is the person C, and the fourth person is the person D, and therefore sets the person A, the person C, and the person D as target objects.

Still referring to FIG. 2, the method further includes the following steps.

S340. Continue to obtain an original video frame through collection, and determine whether there is a first target object that exists in a previous original video frame and does not exist in a current original video frame.

For example, a person (the target object) included in each frame may be recognized by using a human body recognition technology, and then a person included in the current original video frame is compared with a person included in the previous original video frame to determine, as the first target object, a person collected in the previous original video frame but not collected in the current original video frame.

Figure 13A:
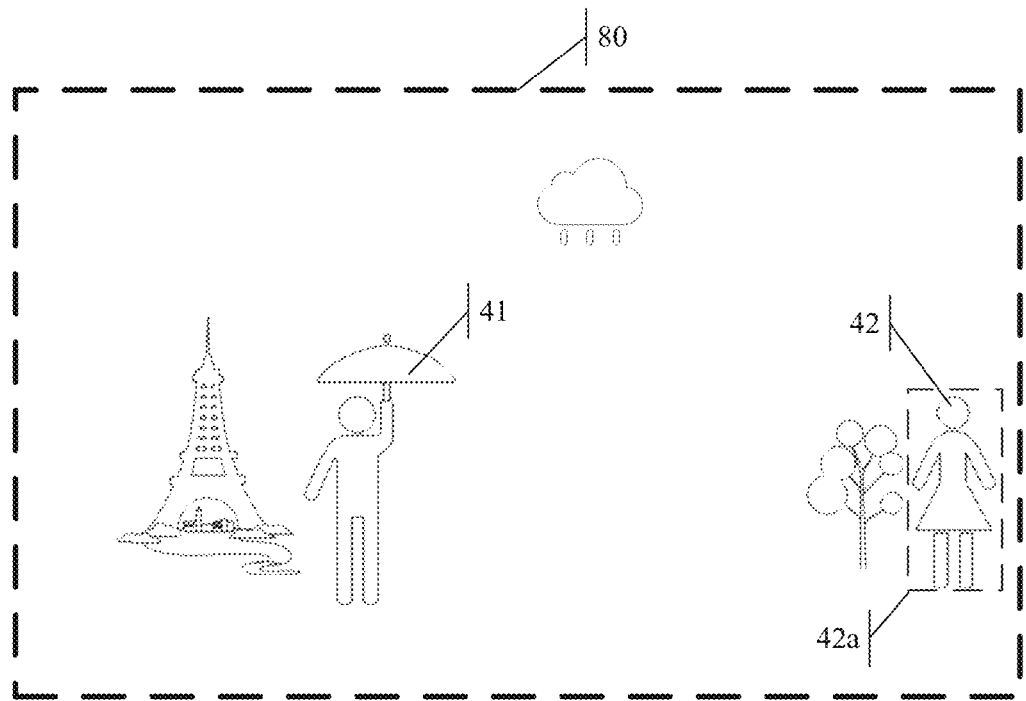
FIG. 13A is a schematic diagram of an original video frame including two persons according to an embodiment of the present disclosure.
Figure 13B:
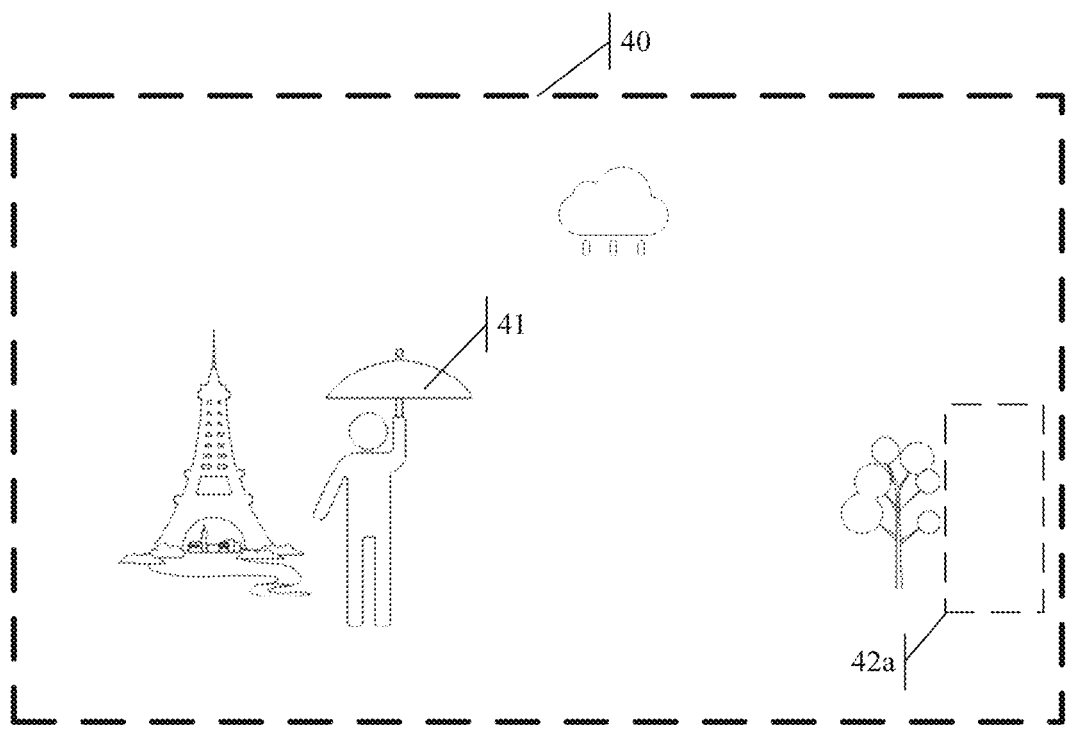
FIG. 13B is a schematic diagram of an original video frame in which one of the two persons in FIG. 13A is absent according to an embodiment of the present disclosure.

For example, it is assumed that the previous original image frame is shown in FIG. 13A. FIG. 13A includes two target objects that are respectively a target object 41 and a target object 42. The target object 42 is located at an edge of the original image frame. The current original image frame is shown in FIG. 13B, and the person 42 is no longer in the original image frame. Therefore, it may be determined that the person 42 is the first target object.

S350. If the first target object exists, continuously detect, in first preset duration, whether the first target object reappears in the original video frame.

The first preset duration may be represented by time, for example, two seconds or three seconds; or the first preset duration may be represented by a quantity of video frames, for example, 20 frames, 30 frames, or 40 frames. After detecting that the first target object exists, the electronic device can start timing.

S360. If the first target object reappears in the original video frame, crop the original video frame by using the first target object and another target object as a center, and output a video frame that uses the first target object and the another target object as a reference.

Figure 13C:
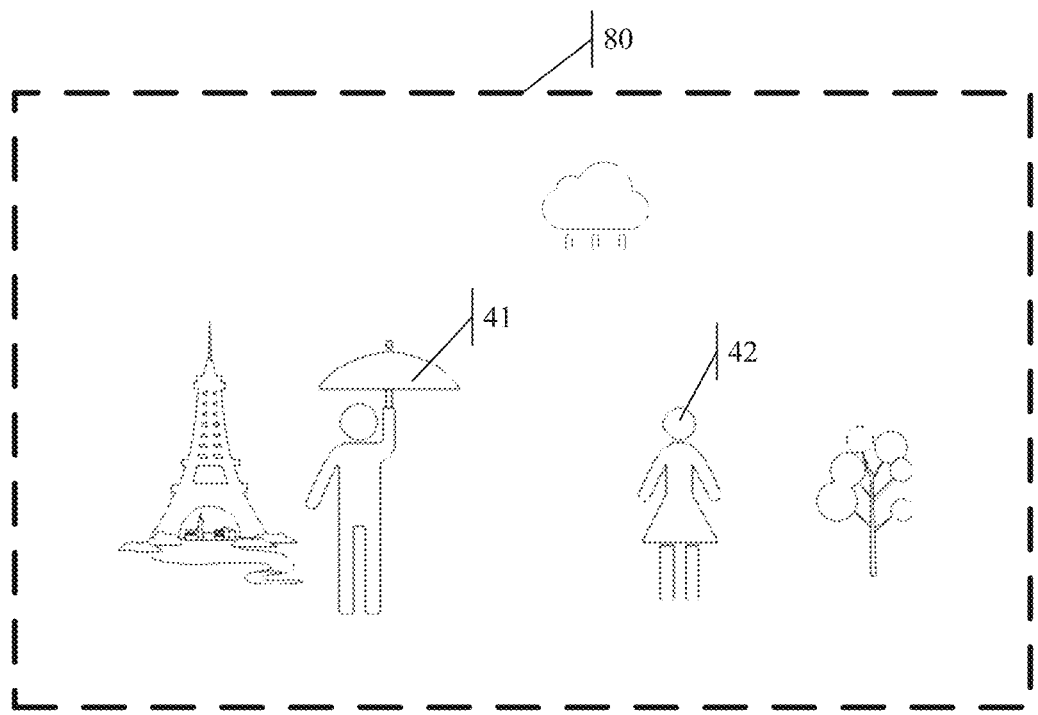
FIG. 13C is a schematic diagram in which a target object left in FIG. 13B returns to a video frame according to an embodiment of the present disclosure.
Figure 13D:
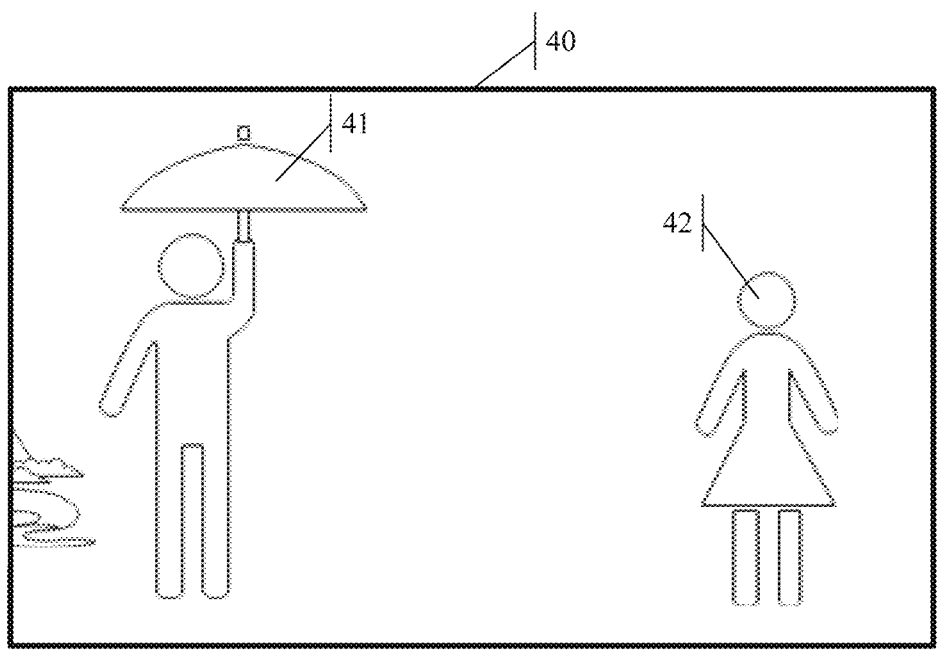
FIG. 13D is a schematic diagram of a video frame that is output based on the original video frame shown in FIG. 13C according to an embodiment of the present disclosure.

Referring to FIG. 13C, assuming that after 1 s, the first target object 42 is detected again in the video frame, and cropping is performing by continuously using the first target object 42 and another target object (for example, the target object 41) as a center, and an output video frame is shown in FIG. 13D.

S370. If the first target object does not reappear in the original video frame, crop the original video frame in the first preset duration by using an original location of the first target object and the another target object as a reference, so as to output a video frame determined based on the original location of the first target object and a location of the another target object.

Figure 13E:
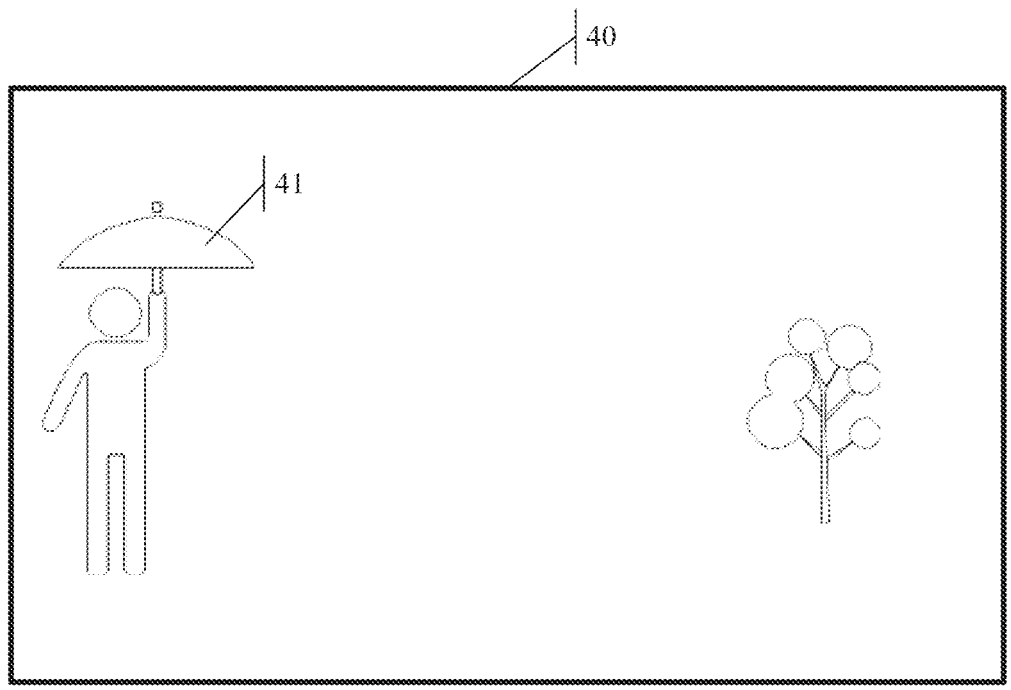
FIG. 13E is a schematic diagram of a video frame that is output in a present time period based on the original video frame shown in FIG. 13B according to an embodiment of the present disclosure.

For example, referring to FIG. 13B, the original location of the first target object is a location 42a at which the first target object 42 last appears in the original video frame. In this case, the original video frame is cropped by using the original location 42a of the person 41 and the first target object 42a as a reference, and an output video frame is, for example, shown in FIG. 13E.

Figure 13F:
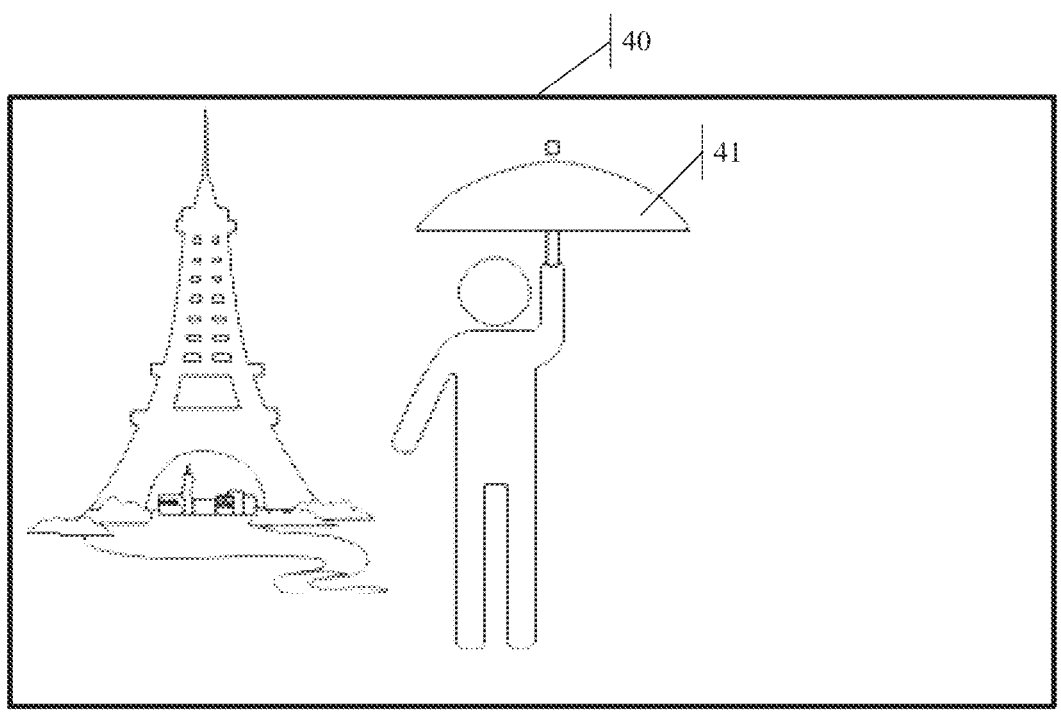
FIG. 13F is a schematic diagram of a video frame that is output after a present time period based on the original video frame shown in FIG. 13B according to an embodiment of the present disclosure.

S380. After the first preset duration, when the original video frame is cropped, skip considering the original location of the first target object, and consider a remaining target object in the original video frame, where an output video frame is a video frame determined based on the remaining target object in the original video frame, and the output video frame is, for example, shown in FIG. 13F.

Based on this solution, in a video collection process, when an output video frame is obtained based on a target object, smoothness of a picture of the video frame can be ensured when the target object temporarily exits a field of view of a camera and then reappears in the field of view of the camera.

Figure 14:
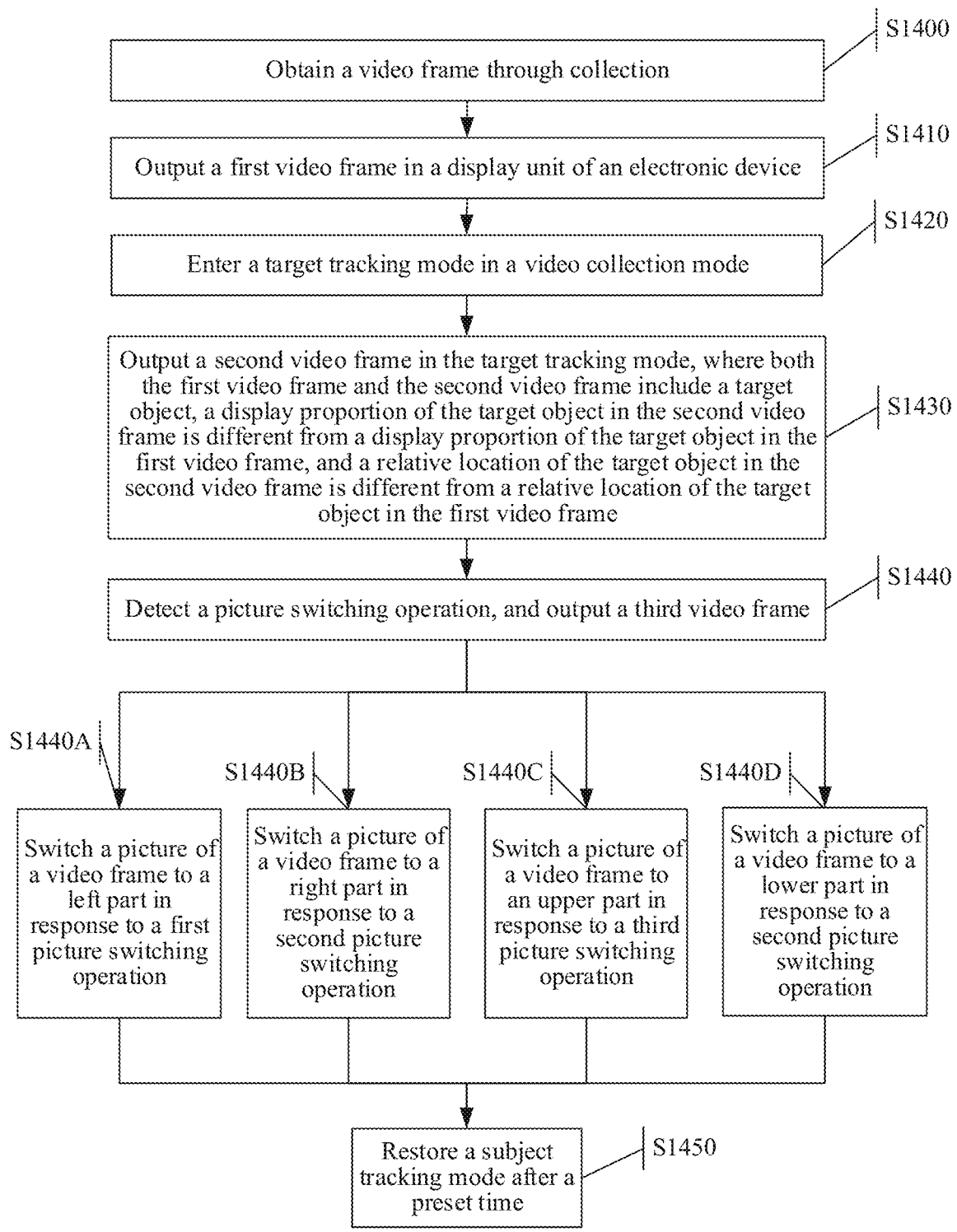
FIG. 14 is a flowchart of a video collection method described in a second aspect according to an embodiment of the present disclosure.

In a second aspect, an embodiment of the present disclosure provides a video collection method. Referring to FIG. 14, the method includes the following steps.

S1400. Obtain a video frame through collection. The collection is similar to that in step S300, and details are not described herein again.

S1410. Output a first video frame in a display unit of an electronic device. This step is similar to step S310, and details are not described herein again.

S1420. Enter a subject tracking mode in a video collection mode. This step is similar to S320, and details are not described herein again.

S1430. Output a second video frame in the subject tracking mode, where both the first video frame and the second video frame include a target object, a display proportion of the target object in the second video frame is different from a display proportion of the target object in the first video frame, and a relative location of the target object in the second video frame is different from a relative location of the target object in the first video frame. This step is similar to S330, and details are not described herein again.

S1440. Detect a picture switching operation, and output a third video frame. When the target object is not displaced, a picture displayed in the third video frame moves relative to a picture displayed in the second video frame.

The picture switching operation may be a plurality of different operations, and therefore there are a plurality of picture moving manners. Four of the manners are listed below for description. Certainly, there are not only the following four cases in one implementation process.

In a first manner, referring to step S1440A, in response to a first picture switching operation, a picture of a video frame is switched leftwards, and the picture may be switched by adjusting a cropping box 81. Two adjustment manners are listed below. Certainly, there are not only the following two cases in one implementation process.

Figure 15A:
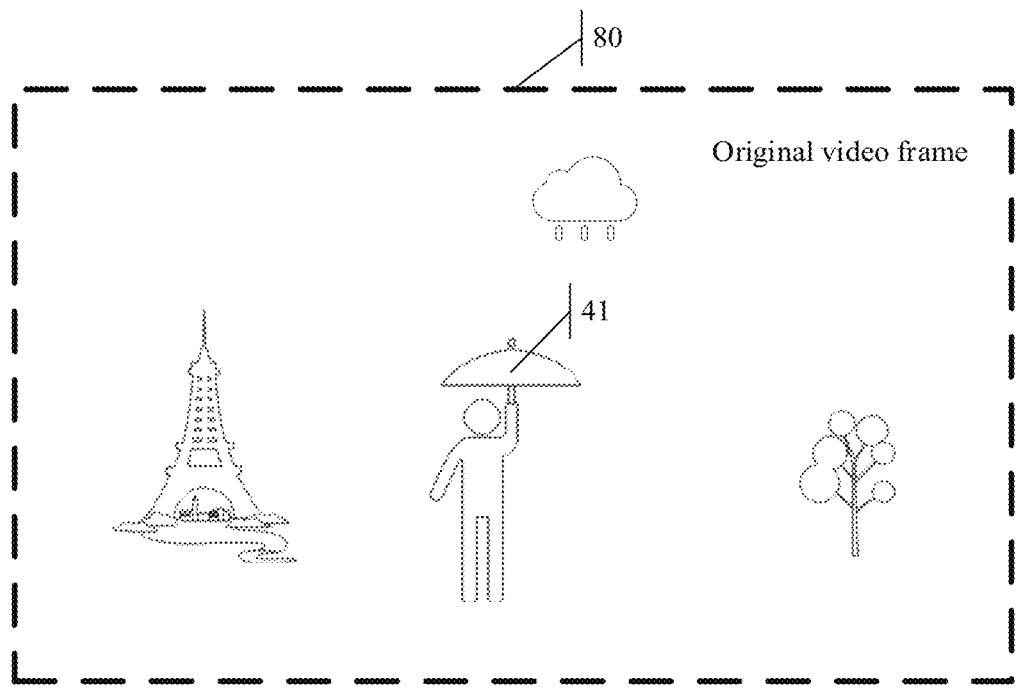
FIG. 15A is a schematic diagram of another original video frame according to an embodiment of the present disclosure.
Figure 15B:
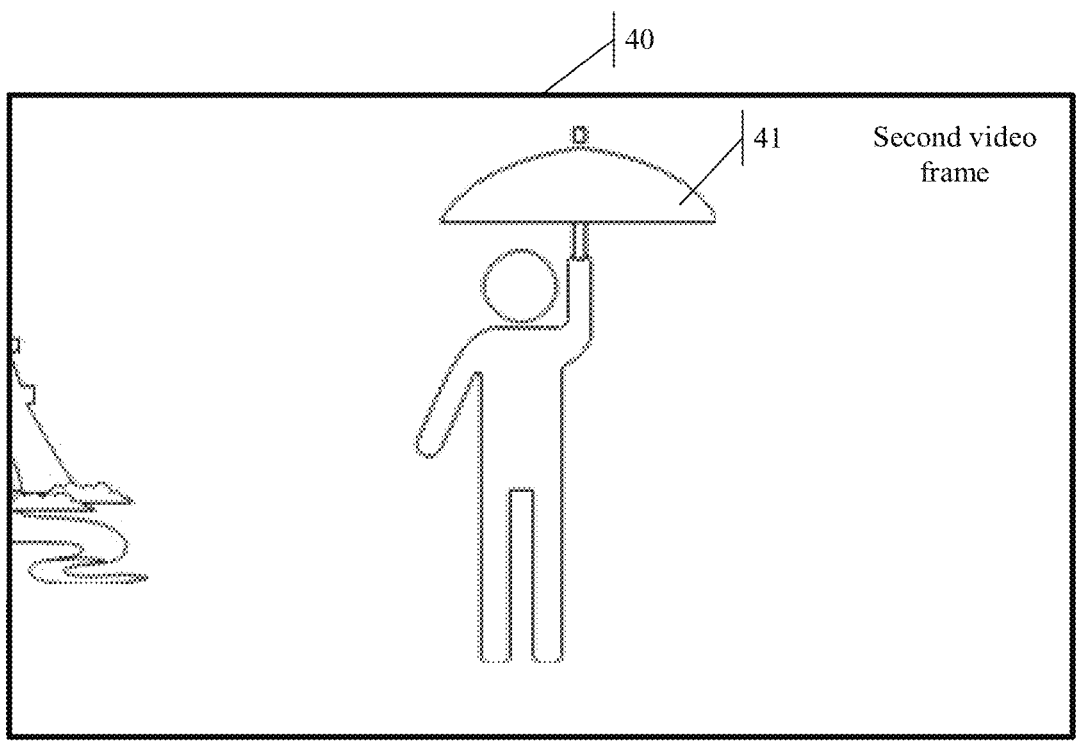
FIG. 15B is a schematic diagram of a video frame that is output based on the original video frame in FIG. 15A according to an embodiment of the present disclosure.

(1) A left box border 50a of the video frame is used as a left cropping side 81a, and a preset proportion (for example, 0.1, 0.3, or 0.5) of Xmax is used as a right cropping point. A line perpendicular to an X-axis is made by using the right cropping point to obtain a right cropping side 81b. An upper cropping side 81c and a lower cropping side 81d of the second video frame are used as an upper cropping side 81c and a lower cropping side 81d of the current video frame (or the upper cropping side 81c and the lower cropping side 81d of the second video frame are fluctuated by a first preset distance, such as 20 pixels or 50 pixels). Alternatively, a line that is made in parallel to an X-axis by passing through a center point that is of a target object in a previous original video frame and that is extended upwards by ¼ of a height of the original video frame is used as an upper cropping side 81c, and a line that is made in parallel to the X-axis by passing through a center point that is of the previous original video frame and that is extended downwards by ¼ of the height of the video frame is used as a lower cropping side 81*d*. Assuming that the original video frame is shown in FIG. 15A, a video frame that is finally output after a picture is switched leftwards based on this solution is, for example, shown in FIG. 15B. Therefore, the finally output video frame is a left part of the original video frame.

(2) An entire cropping box 81 is moved leftwards by a second preset distance, for example, 20% or 30% of a width of an original image frame. Optionally, the cropping box 81 may be floated up and down by a first preset distance. Therefore, an output video frame is a picture that is determined by moving the second video frame leftwards by the second preset distance.

For example, a first preset operation is an operation of pointing to the left by an arm of a person (which may be any person or may be only a target object) in a video frame, dragging a video frame rightwards in a touch display unit, or generating a voice instruction. A joint point of a person in the video frame may be recognized by using a key point recognition technology, and then coordinates of an elbow joint and a wrist joint of a hand are determined to determine whether the operation of pointing to the left by an arm exists. For example, if a person faces a camera, a difference between vertical coordinate values of the elbow joint and the wrist joint is not relatively large, and a horizontal coordinate of the elbow joint is greater than that of the wrist joint, it may be determined that the operation of pointing to the left by an arm exists.

In a second manner, referring to step S1440B, in response to a second picture switching operation, a picture of a video frame is switched leftwards.

The picture may be switched by adjusting a cropping box 81. Two adjustment manners are listed below. Certainly, there are not only the following two cases in one implementation process.

(1) A right box border 50*b* of the video frame is used as a right cropping side 81*b*, a result obtained by subtracting a preset proportion (for example, 0.1, 0.3, or 0.5) of Xmax from Xmax is used as a left cropping point. A line perpendicular to an X-axis is made by using the left cropping point to obtain a left cropping side 81*a*. An upper cropping side 81*c* and a lower cropping side 81*d* of the second video frame are used as an upper cropping side 81*c* and a lower cropping side 81*d* of the current video frame (or the upper cropping side 81*c* and the lower cropping side 81*d* of the second video frame are fluctuated by a first preset distance, such as 20 pixels or 50 pixels). Alternatively, a line that is made in parallel to an X-axis by passing through a center point that is of a target object in a previous original video frame and that is extended upwards by ¼ of a height of the original video frame is used as an upper cropping side 81*c*, and a line that is made in parallel to the X-axis by passing through a center point that is of the previous original video frame and that is extended downwards by ¼ of the height of the video frame is used as a lower cropping side 81*d*. Therefore, the finally output video frame is a right part of the original image frame.

Figure 15C:
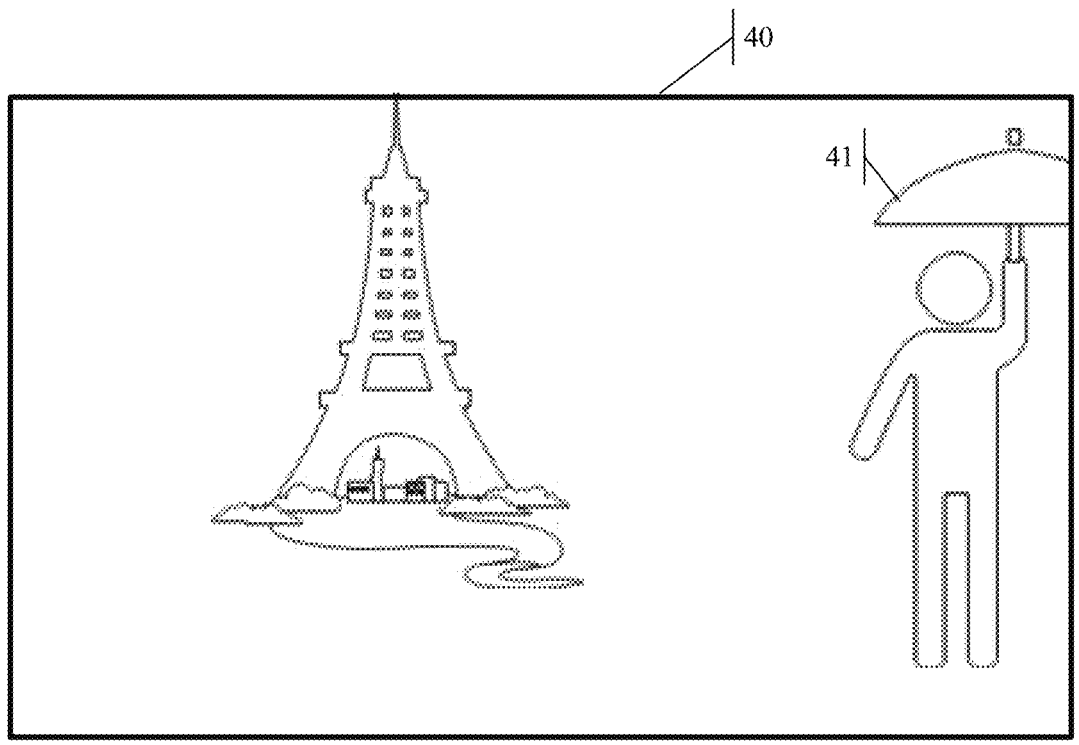
FIG. 15C is a schematic diagram obtained after a picture shown in FIG. 15B is switched leftwards according to an embodiment of the present disclosure.
Figure 15D:
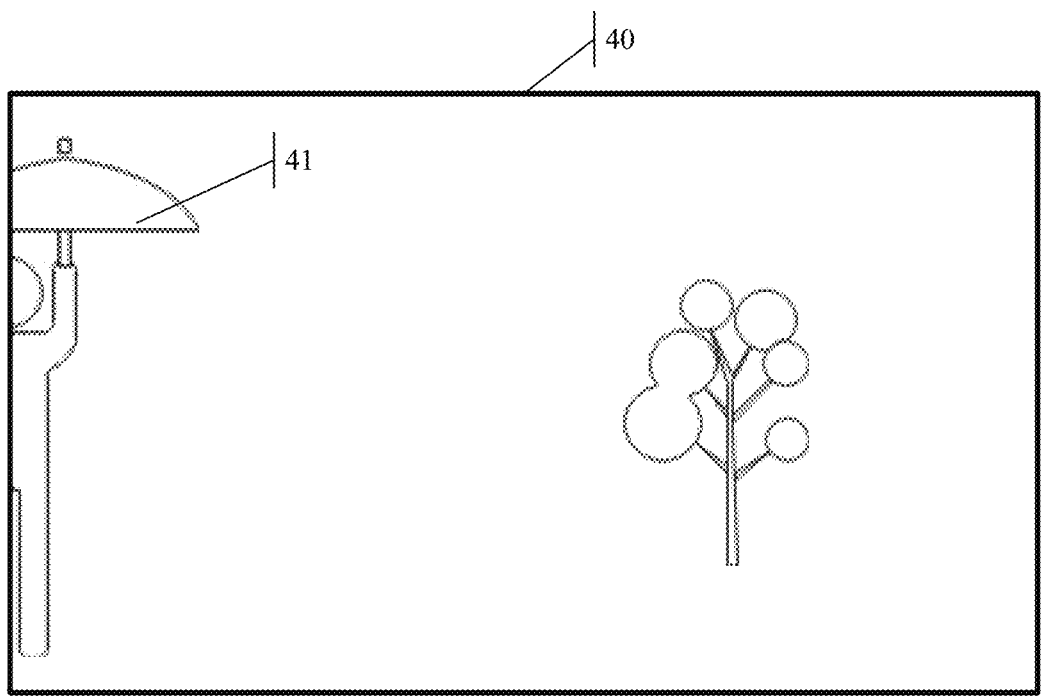
FIG. 15D is a schematic diagram obtained after a picture shown in FIG. 15B is switched leftwards according to an embodiment of the present disclosure.

Assuming that the original video frame is shown in FIG. 15A, a video frame that is finally output after a picture is switched rightwards based on this solution is, for example, shown in FIG. 15C.

(2) An entire cropping box 81 is moved rightwards by a third preset distance, for example, 20% or 30% of a width of an original image frame. Optionally, the cropping box 81 may be floated up and down by a first preset distance. Therefore, the finally output video frame is a picture obtained by moving a picture of the second video frame rightwards by the third preset distance.

In a third manner, referring to step S1440C, in response to a third picture switching operation, a picture of a video frame is switched upwards. For example, the third picture switching operation is an operation of performing dragging in a display unit from top to bottom, an operation of swing an arm from top to bottom, or a voice instruction. A manner of switching the picture upwards is similar to a manner of switching the picture leftwards or rightwards, and details are not described herein again.

In a fourth manner, referring to step S1440D, in response to a fourth picture switching operation, a picture of a video frame is switched downwards. For example, the fourth picture switching operation is an operation of performing dragging in a display unit from bottom to up, an operation of swing an arm from bottom to top, or a voice instruction. A manner of switching the picture downwards is similar to a manner of switching the picture leftwards or rightwards, and details are not described herein again.

S1450. After a preset time, restore a subject tracking mode, and output a fourth video frame. When a displacement of the target object is less than a first preset displacement, an offset between a relative location of the target object in the fourth video frame and a relative location of the target object in the second video frame is less than a second preset displacement. To be specific, if the target object is not moved or moves relatively little when the second video frame and the fourth video frame are output, a difference between the second video frame and the fourth video frame is also relatively small.

For example, the preset time is two seconds or three seconds. This is not limited in this embodiment of the present disclosure. How to crop a video frame based on the target object is described above, and details are not described herein again.

In one implementation process, the video collection method may further include the following step: A focus is focused on the person in response to a focus focusing operation, for example, magnifying a proportion of the person in the video frame, performing blurring processing on a background region, and adding a special effect to the person. For example, a fifth preset operation is an operation of double tapping a region in which the person is located in the video frame, or an operation of generating a specific gesture.

After the second video frame is output based on S1430, the method further includes: exiting the subject tracking mode in response to a user operation, and outputting the fourth video frame. A display proportion of the target object in the fourth video frame is different from a display proportion of the target object in the second video frame, and the relative location of the target object in the fourth video frame is different from the relative location of the target object in the second video frame. For example, the display proportion of the target object in the fourth video frame is less than the display proportion of the target object in the second video frame. When the target object is not displaced, the fourth video frame is similar to the second video frame, and details are not described herein again.

After the second video frame is output based on S1430, the method further includes: outputting a fifth video frame in response to an amplification operation. A display size of the target object in the fifth video frame is greater than a display size of the target object in the second video frame.

Figure 16:
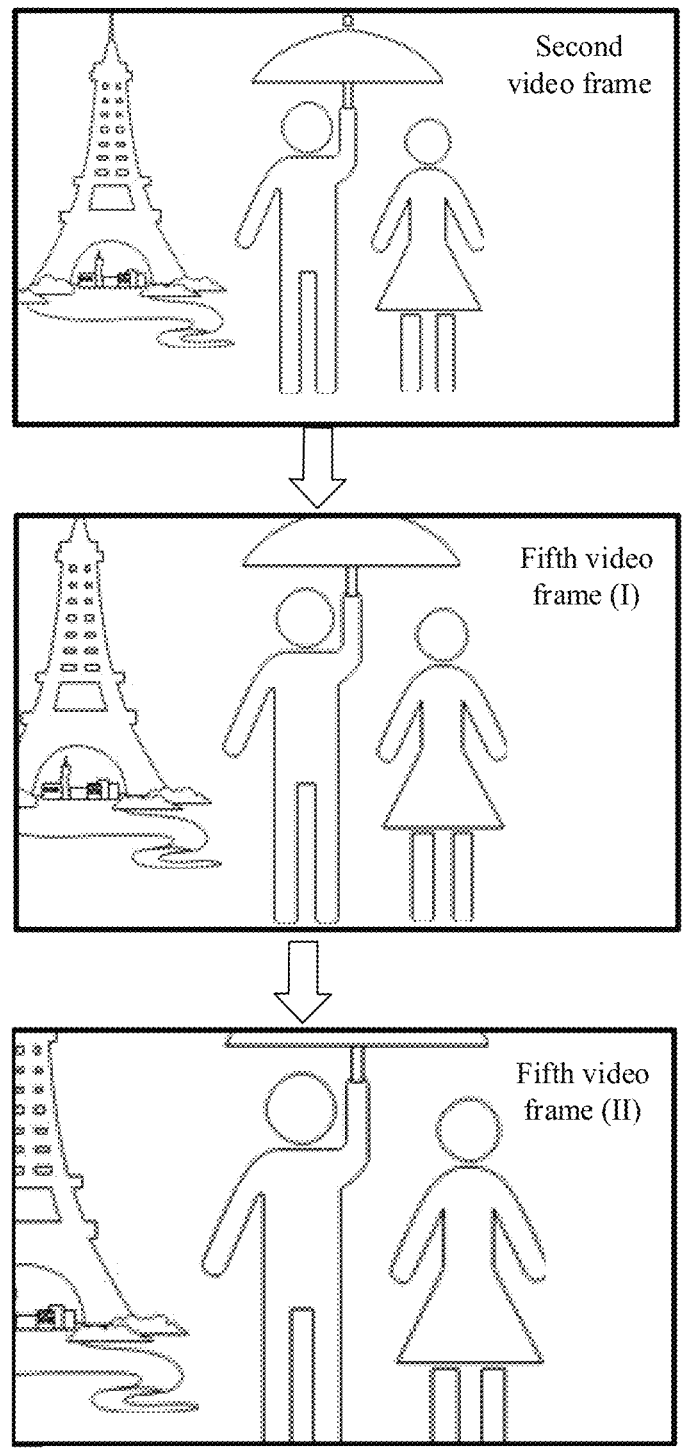
FIG. 16 is a schematic diagram in which an amplification operation is performed on a video frame according to an embodiment of the present disclosure.

For example, the amplification operation is a preset gesture (for example, pushing a palm outwards or opening five fingers), or a voice instruction. FIG. 16 is a schematic diagram of a comparison between the second video frame and the fifth video frame. The display size of the target object may be gradually amplified based on the amplification operation to output a plurality of video frames with an increasingly large display size of the target object. As shown in FIG. 16, after the second video frame is output, a fifth video frame (I) is output, and then a fifth video frame (II) is output, to implement a smooth transition.

Figure 17:
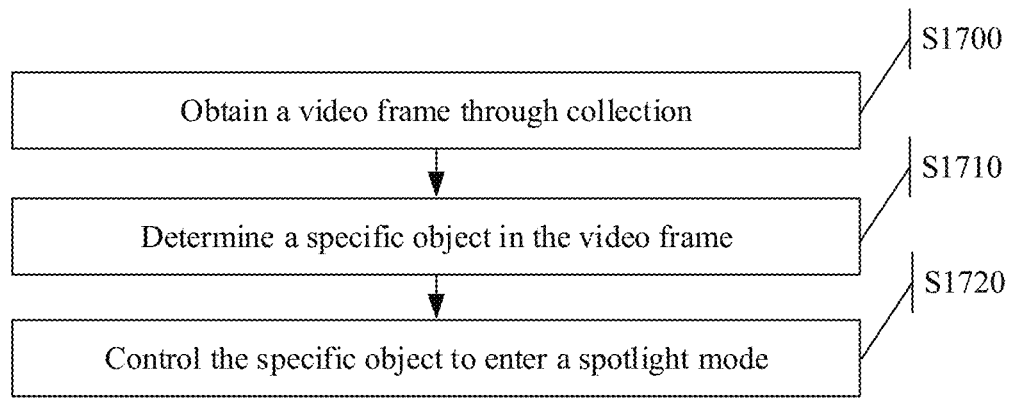
FIG. 17 is a flowchart of a video collection method in a third aspect according to an embodiment of the present disclosure.

A third embodiment of the present disclosure provides a video collection method. Referring to FIG. 17, the method includes the following steps.

S1700. Obtain a video frame through collection. This step is similar to S300, and details are not described herein again.

S1710. Determine a specific object in the video frame.

In one implementation process, the specific object may be a single specific object, or may be at least two specific objects, and the specific object may be a person, an animal, another moving object, or the like. The target object may be determined in a plurality of manners, and several of the manners are listed below for description. Certainly, there are not only the following several cases in one implementation process.

In a first manner, the specific object is determined by performing a selection operation on the specific object in the video frame.

Figure 18A:
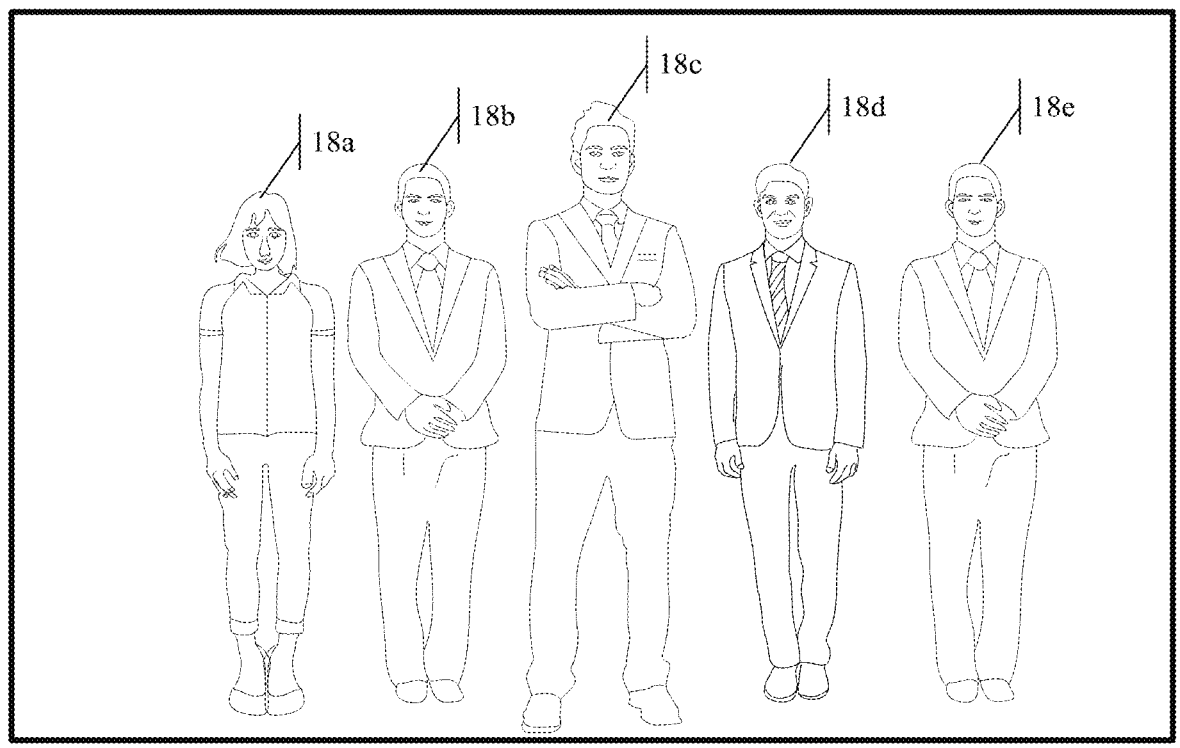
FIG. 18A is a schematic diagram of a collected video frame including a plurality of persons according to an embodiment of the present disclosure.

For example, FIG. 18A is a schematic diagram of a video frame in a video communication process. The video frame includes five persons that are respectively a person A 18a, a person B 18b, a person C 18c, a person D 18d, and a person E 18e. If a user of an electronic device wants to determine the person 18b as the specific object, the user generates a selection operation for the person B 18b in the video frame (for example, tapping or sliding), and the electronic device determines the person B 18b as the specific object in response to the selection operation.

The user may select one specific object, or may select a plurality of specific objects. For example, the user may select a plurality of specific objects by using a plurality of selection operations, or the user may select a plurality of specific objects by using one operation. For example, the user simultaneously selects two specific objects by using two fingers with each finger corresponding to one target.

In a second manner, a sound source is located by using a microphone of the electronic device, and a person in a region in which the sound source is located is determined as the specific object.

For example, this solution may be applied to a multi-person discussion scenario or a multi-person singing scenario. For example, the video frame still includes a person A 18a, a person B 18b, a person C 18c, a person D 18d, and a person E 18e. The five persons discuss a problem. At a first moment, the person B 18b speaks, and the person B 18b is determined as the specific object. At a second moment, the person D 18d speaks, and the person D 18d is determined as the specific object, and so on. A current speaker can be determined by locating the specific object.

In a third manner, all persons included in the video frame are determined by using a person recognition technology, and a person in the middle is determined as the specific object. For example, the video frame still includes the person A 18a, the person B 18b, the person C 18c, the person D 18d, and the person E 18e shown in FIG. 18A. After recognizing locations of the five persons, the electronic device determines that the person C 18c is in the middle, and therefore determines the person C as the specific object.

In a fourth manner, a voice instruction of a user is received, and the specific object is determined by using the voice instruction. For example, a user of the electronic device says "setting a spotlight effect for a person in the middle", and in this case, it is determined that the specific object is the person in the middle (for example, a person C 18c). For another example, a user of the electronic device says "setting a spotlight effect for a highest person", and in this case, it is determined that the specific object is the highest person in the video frame.

In a fifth manner, gesture recognition is performed on a person collected in the video frame, and a person using a preset gesture is determined as the specific object. For example, the preset gesture is raising a hand or swinging a hand.

S1720: Control the specific object to enter a spotlight mode.

In one implementation process, after the specific object is determined, the specific object may be directly controlled to enter the spotlight mode. Alternatively, after the specific object is determined, a preset operation may be received, and the electronic device controls the specific object to enter the spotlight mode in response to the preset operation, so as to highlight the specific object in the spotlight mode.

Steps S1710 and S1720 may be implemented in a plurality of manners, and two of the manners are listed below for description. Certainly, there are not only the following two cases in one implementation process.

In a first manner, a user of the electronic device generates a preset operation, and the preset operation is used to control video communication to enter the spotlight mode. For example, the preset operation is an operation of tapping a preset button that represents the spotlight mode, an operation of generating a voice instruction of entering the spotlight mode, or an operation of generating a preset gesture. After detecting the preset operation, the electronic device performs step S1610 to prompt the user of the electronic device to select the specific object or automatically determine the specific object. After the specific object is determined, the electronic device automatically performs step S1720, that is, the electronic device controls the specific object to enter the spotlight mode.

In a second manner, the electronic device determines the specific object based on a user operation (step S1710). A specific manner of determining the specific object is described above, and details are not described herein again. After the specific object is determined, a user of the electronic device generates a preset operation, and the electronic device controls the specific object to enter the spotlight mode in response to the preset operation (step S1720).

Figure 18B:
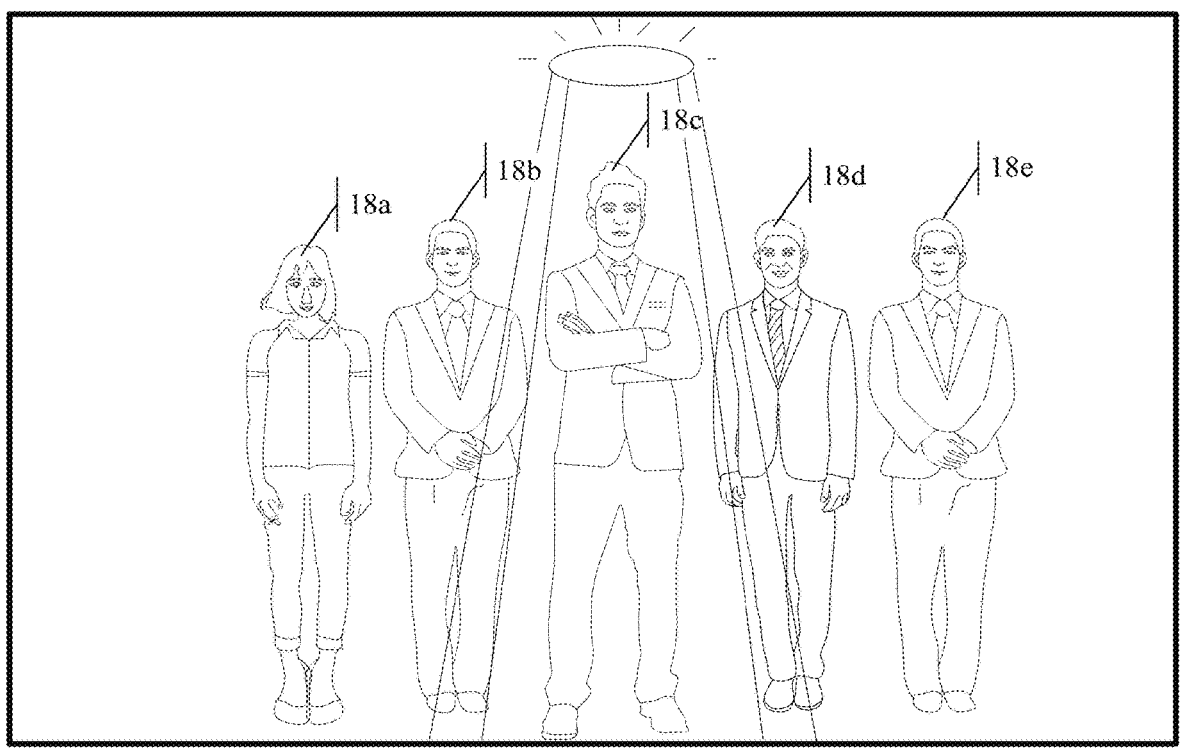
FIG. 18B is a schematic diagram in which a spotlight effect is added to the person in FIG. 18A according to an embodiment of the present disclosure.

In one implementation process, the spotlight mode is a mode in which the specific object is highlighted, and the specific object may be highlighted in a plurality of manners. For example, referring to FIG. 18B, a spotlight effect (setting a high light) is set for the specific object, color display is controlled for the specific object, content other than the specific object is displayed in black and white, or content other than the specific object is displayed in a blurring manner.

For other content, refer to the foregoing related content description, and details are not described again.

It can be understood that to implement the foregoing functions, the electronic device includes a corresponding hardware structure and/or software module for performing each of the functions. A person of ordinary skill in the art should easily be aware that, in combination with the examples described in the embodiments disclosed in this specification, units, algorithms, and steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of the present disclosure.

In the embodiments of this disclosure, the foregoing electronic device and the like may be divided into functional modules based on the foregoing method examples. For example, each functional module may be obtained through division for a corresponding function, or two or more functions may be integrated into one processing module. The integrated module may be implemented in a form of hardware, or may be implemented in a form of a software functional module. It should be noted that, in this embodiment of the present disclosure, division in to the modules is an example, and is merely a logical function division. In actual implementation, another division manner may be used. That each functional module is obtained through division based on each corresponding function is used as an example for description below.

All or some of the foregoing methods in the embodiments of this disclosure may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedures or functions according to the embodiments of this disclosure are all or partially generated. The computer may be a general-purpose computer, a dedicated computer, a computer network, a network device, an electronic device, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state device (SSD)), or the like.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this disclosure, it should be understood that the disclosed system, apparatus, and method may be implemented in other manners. For example, the described apparatus embodiment is merely an example. For example, the division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

The foregoing descriptions are merely implementations of this disclosure, but are not intended to limit the protection scope of the embodiments of this disclosure. Any variation or replacement readily figured out by a person skilled in the art within the technical scope disclosed in the embodiments of this disclosure shall fall within the protection scope of the embodiments of this disclosure. Therefore, the protection scope of the embodiments of this disclosure should be subject to the protection scope of the claims.

What is claimed is:

1. A method, applied to an electronic device, comprising:
obtaining a first video frame;
determining that the first video frame comprises a first target object;
determining a first cropping box by using a coordinate box comprising a left box border, a right box border, an upper box border, and a lower box border;
determining a center of the first target object by using the coordinate box, wherein a first preset distance exists between a lower cropping side of the first cropping box and a preset joint point of the first target object;
determining a width of the first target object and a width of the first video frame;
determining a cropping width for cropping the first video frame based on the width of the first target object and the width of the first video frame;
determining a left cropping side and a right cropping side by using the cropping width, wherein the left box border of the coordinate box is used as the left cropping side and the right box border of the coordinate box is used as the right cropping side;

determining an upper cropping side and the lower cropping side based on a vertical coordinate of the first target object in the coordinate box, wherein the upper box border is used as the upper cropping side and the lower box border is used as the lower cropping side;

determining the first cropping box based on the upper cropping side, the lower cropping side, the left cropping side, and the right cropping side;

obtaining content in the first cropping box; and outputting the content as a second video frame.

2. The method of claim 1, wherein the determining the first cropping box further comprises:

determining a first pre-cropping box according to a preset rule;

determining whether the first preset distance exists between a lower cropping side of the first pre-cropping box and the preset joint point; and moving, when the first preset distance does not exist between the lower cropping side of the first pre-cropping box and the preset joint point, moving the lower cropping side of the first pre-cropping box upwards to a cropping location corresponding to the preset joint point to obtain the first cropping box.

3. The method of claim 1, wherein the determining the first cropping box by using the first target object as the center further comprises:

determining a first pre-cropping box according to a preset rule;

determining whether a center line of the first pre-cropping box is located below a center line of the first target object; and moving, when the center line of the first pre-cropping box is not located below the center line of the first target object, an upper cropping side of the first pre-cropping box upwards by a second preset distance and a lower cropping side of the first pre-cropping box downwards by a third preset distance to obtain the first cropping box.

4. The method of claim 1, further comprising:

obtaining a third video frame through collection;

determining, when it is detected that content that meets a preset gesture exists is in the third video frame, a direction corresponding to the preset gesture;

determining a second cropping box based on the direction of the preset gesture, wherein the second cropping box moves relative to the first cropping box in the direction corresponding to the preset gesture;

obtaining content in the second cropping box; and outputting the content as a fourth video frame.

5. The method of claim 4, wherein when the direction of the preset gesture is a direction in which an arm of a person in the third video frame points to the left, the second cropping box is a cropping box that moves leftwards relative to the first cropping box; or wherein when the direction of the preset gesture is a direction in which an arm of a person in the third video frame points to the right, the second cropping box is a cropping box that moves rightwards relative to the first cropping box.

6. The method of claim 1, further comprising:

obtaining a third video frame through collection, wherein the third video frame comprises at least two target objects comprising the first target object and a second target object;

determining a second cropping box by using the at least two target objects as centers, wherein a lower cropping side of the second cropping box is located below a center line of the first target object in a horizontal direction and is located below a center line of the second target object in a horizontal direction; and obtaining content in the second cropping box, and outputting the content as a fourth video frame.

7. The method of claim 6, further comprising wherein determining a third cropping box comprises:

determining a pre-cropping box according to a preset rule;

determining a first center line of the first target object in a horizontal direction and a second center line of the second target object in a horizontal direction;

determining whether a lower cropping side of the pre-cropping box is located below the first center line and the second center line; and moving, when the lower cropping side of the pre-cropping box is not located below the first center line or the lower cropping side of the pre-cropping box is not located below the second center line, the lower cropping side of the pre-cropping box downwards until the lower cropping side of the pre-cropping box is located below the first center line and the second center line.

8. The method of claim 7, wherein determining the first center line of the first target object in the horizontal direction and the second center line of the second target object in the horizontal direction comprises:

determining a relative distance between a first preset key point of the first target object and the first preset key point of the second target object;

determining whether the relative distance is greater than a preset threshold; and determining, when the relative distance is greater than the preset threshold, the first center line and the second center line.

9. The method of claim 1, further comprises:

obtaining a third video frame through collection, wherein the third video frame comprises at least two target objects comprising the first target object and a second target object;

determining whether a focus operation focusing on the second target object exists;

determining, when the focus operation exists, a second cropping box by using the second target object as a center;

obtaining content in the second cropping box; and outputting the content as a fourth video frame.

10. The method of claim 1, wherein before the determining the first cropping box by using the first target object as the center, the method further comprises:

obtaining a third video frame through collection;

outputting the third video frame that is not cropped;

detecting and obtaining a first operation, and entering a target tracking mode in response to the first operation; and determining the first cropping box by using the first target object as the center after entering the target tracking mode.

11. The method of claim 10, further comprising after the detecting and obtaining a first operation and entering the target tracking mode in response to the first operation:

detecting a second operation in the target tracking mode; and using a spotlight effect on at least one of the target objects in at least one of video frames output by the electronic device in response to the second operation.

12. The method of claim 1, further comprising during a video call process:
- transmitting the second video frame to a peer electronic device; or
- displaying the second video frame in a video communications interface.

13. An electronic device, comprising:
- a processor;
- memory; and
- one or more applications stored in the memory that when executed by the processor configure the electronic device to:
  - obtain a first video frame;
  - determine that the first video frame comprises a first target object;
  - determine a first cropping box by using a coordinate box comprising a left box border, a right box border, an upper box border, and a lower box border;
  - determine a center of the first target object by using the coordinate box, wherein a first preset distance exists between a lower cropping side of the first cropping box and a preset joint point of the first target object;
  - determine a width of the first target object and a width of the first video frame;
  - determine a cropping width for cropping the first video frame based on the width of the first target object and the width of the first video frame;
  - determine a left cropping side and a right cropping side by using the cropping width, wherein the left box border of the coordinate box is used as the left cropping side and the right box border of the coordinate box is used as the right cropping side;
  - determine an upper cropping side and the lower cropping side based on a vertical coordinate of the first target object in the coordinate box, wherein the upper box border is used as the upper cropping side and the lower box border is used as the lower cropping side;
  - determine the first cropping box based on the upper cropping side, the lower cropping side, the left cropping side, and the right cropping side;
  - obtain content in the first cropping box; and
  - output the content as a second video frame.

14. The electronic device of claim 13, wherein the one or more applications when executed by the processor further configure the electronic device to:
- determine a first pre-cropping box according to a preset rule;
- determine whether a first preset distance exists between the lower cropping side of the first pre-cropping box and the preset joint point; and
- move, when the first preset distance does not exist between the lower cropping side of the first pre-cropping box and the preset joint point, the lower cropping side of the first pre-cropping box upwards to a cropping location corresponding to the preset joint point to obtain the first cropping box.

15. The electronic device of claim 13, wherein the one or more applications when executed by the processor further configure the electronic device to:
- determine a first pre-cropping box according to a preset rule;
- determine whether a center line of the first pre-cropping box is located below a center line of the first target object; and
- move, when the center line of the first pre-cropping box is not located below the center line of the first target object, an upper cropping side of the first pre-cropping box upwards by a second preset distance and a lower cropping side of the first pre-cropping box downwards by a third preset distance to obtain the first cropping box.

16. The electronic device of claim 13, wherein the one or more applications when executed by the processor further configure the electronic device to:
- obtain a third video frame through collection;
- when it is detected that content that meets a preset gesture exists in the third video frame, determine a direction corresponding to the preset gesture;
- determine a second cropping box based on the direction of the preset gesture, wherein the second cropping box moves relative to the first cropping box in the direction corresponding to the preset gesture;
- obtain content in the second cropping box; and
- output the content as a fourth video frame.

17. The electronic device of claim 16, wherein the one or more applications when executed by the processor further configure the electronic device to:
- when the direction of the preset gesture is a direction in which an arm of a person in the third video frame points to the left, the second cropping box is a cropping box that moves leftwards relative to the first cropping box;
- when the direction of the preset gesture is a direction in which an arm of a person in the third video frame points to the right, the second cropping box is a cropping box that moves rightwards relative to the first cropping box;
- when the direction of the preset gesture is a direction in which an arm of a person in the third video frame swings from top to bottom, the second cropping box is a cropping box that moves upwards relative to the first cropping box; or
- when the direction of the preset gesture is a direction in which an arm of a person in the third video frame swings from bottom to top, the second cropping box is a cropping box that moves downwards relative to the first cropping box.

18. The electronic device of claim 13, wherein the one or more applications when executed by the processor further configure the electronic device to:
- obtain a third video frame through collection, wherein the third video frame comprises at least two target objects comprising the first target object and a second target object;
- determine a second cropping box by using the at least two target objects as centers, wherein a lower cropping side of the second cropping box is located below a center line of the first target object in a horizontal direction and is located below a center line of the second target object in a horizontal direction;
- obtain content in the second cropping box; and
- output the content as a fourth video frame.

19. A non-transitory computer-readable storage medium, comprising instructions, that when executed perform a method comprising:
- obtaining a first video frame;
- determining that the first video frame comprises a first target object;
- determining a first cropping box by using a coordinate box comprising a left box border, a right box border, an upper box border, and a lower box border;
- determining a center of the first target object by using the coordinate box, wherein a first preset distance exists between a lower cropping side of the first cropping box and a preset joint point of the first target object;

determining a width of the first target object and a width of the first video frame;

determining a cropping width for cropping the first video frame based on the width of the first target object and the width of the first video frame;

determining a left cropping side and a right cropping side by using the cropping width, wherein the left box border of the coordinate box is used as the left cropping side and the right box border of the coordinate box is used as the right cropping side;

determining an upper cropping side and the lower cropping side based on a vertical coordinate of the first target object in the coordinate box, wherein the upper box border is used as the upper cropping side and the lower box border is used as the lower cropping side;

determining the first cropping box based on the upper cropping side, the lower cropping side, the left cropping side, and the right cropping side;

obtaining content in the first cropping box; and outputting the content as a second video frame.

20. The method of claim 4, wherein when the direction of the preset gesture is a direction in which an arm of a person in the third video frame swings from top to bottom, the second cropping box is a cropping box that moves upwards relative to the first cropping box; or wherein when the direction of the preset gesture is a direction in which an arm of a person in the third video frame swings from bottom to top, the second cropping box is a cropping box that moves downwards relative to the first cropping box.

\* \* \* \* \*